United States Patent
Cisler et al.

(10) Patent No.: US 11,188,422 B2
(45) Date of Patent: Nov. 30, 2021

(54) TECHNIQUES FOR PRESERVING CLONE RELATIONSHIPS BETWEEN FILES

(71) Applicant: Apple Inc., Cupertino, CA (US)

(72) Inventors: Pavel Cisler, Redwood City, CA (US); Christopher A. Wolf, Bahama, NC (US); Loic E. Vandereyken, Palo Alto, CA (US); Eric A. Weiss, Paris (FR)

(73) Assignee: Apple Inc., Cupertino, CA (US)

( * ) Notice: Subject to any disclaimer, the term of this patent is extended or adjusted under 35 U.S.C. 154(b) by 351 days.

(21) Appl. No.: 15/721,287

(22) Filed: Sep. 29, 2017

(65) Prior Publication Data
US 2018/0349226 A1    Dec. 6, 2018

Related U.S. Application Data

(60) Provisional application No. 62/514,733, filed on Jun. 2, 2017.

(51) Int. Cl.
*G06F 16/00* (2019.01)
*G06F 11/14* (2006.01)
(Continued)

(52) U.S. Cl.
CPC ........ *G06F 11/1448* (2013.01); *G06F 3/0486* (2013.01); *G06F 11/1469* (2013.01);
(Continued)

(58) Field of Classification Search
CPC .. G06F 11/1448; G06F 16/164; G06F 16/168; G06F 16/178; G06F 16/128;
(Continued)

(56) References Cited

U.S. PATENT DOCUMENTS 5,970,496 A * 10/1999 Katzenberger ...... G06F 16/9024
7,293,058 B2    11/2007 Thurman et al.
(Continued)

FOREIGN PATENT DOCUMENTS

CN    103164295 B    5/2015

OTHER PUBLICATIONS

Kurt Hansen et al., "Decoding the APFS file system", http://dx/doi.org/10.1016/j.diin.2017.07.003, received date of Apr. 22, 2017, 26 pages.*
(Continued)

*Primary Examiner* — Monica M Pyo
(74) *Attorney, Agent, or Firm* — Dickinson Wright RLLP

(57) ABSTRACT

The described embodiments set forth techniques for preserving clone relationships between files at a computing device. In particular, the techniques involve identifying clone relationships between files in conjunction with performing operations on the files where it can be beneficial to preserve the clone relationships. The operations can include, for example, preserving clone relationships between files that are being copied from a source storage device (that supports file cloning) to a destination storage device that supports file cloning. Additionally, the operations can include preserving clone relationships when backing up and restoring files between a source storage device (that supports file cloning) and a destination storage device that does not support file cloning. In this manner, the various benefits afforded by the clone relationships between files can be retained even as the files are propagated to destination storage devices that may or may not support file cloning.

20 Claims, 21 Drawing Sheets

(51) Int. Cl.
  *G06F 16/11* (2019.01)
  *G06F 16/16* (2019.01)
  *G06F 16/178* (2019.01)
  *G06F 3/0486* (2013.01)
  *G06F 3/0484* (2013.01)

(52) U.S. Cl.
  CPC ............ *G06F 16/11* (2019.01); *G06F 16/128* (2019.01); *G06F 16/164* (2019.01); *G06F 16/168* (2019.01); *G06F 16/178* (2019.01); *G06F 3/04845* (2013.01); *G06F 2201/80* (2013.01); *G06F 2201/805* (2013.01); *G06F 2201/82* (2013.01)

(58) Field of Classification Search
  CPC ............. G06F 3/04845; G06F 2201/80; G06F 2201/805; G06F 2201/82
  USPC .......................................... 707/640
  See application file for complete search history.

(56) References Cited

U.S. PATENT DOCUMENTS

| | | | |
|---|---|---|---|
| 8,055,613 B1 * | 11/2011 | Mu | G06F 16/1734 707/610 |
| 8,453,145 B1 | 5/2013 | Naik | |
| 8,533,189 B2 | 9/2013 | Ingen et al. | |
| 8,655,848 B1 | 2/2014 | Leverett et al. | |
| 8,819,856 B1 | 8/2014 | Tiffe et al. | |
| 8,918,378 B1 * | 12/2014 | Faith | G06F 3/065 707/695 |
| 9,128,942 B1 | 9/2015 | Pfau et al. | |
| 9,171,002 B1 | 10/2015 | Mam et al. | |
| 9,223,500 B1 | 12/2015 | Lemar et al. | |
| 9,514,140 B2 | 12/2016 | Yueh | |
| 9,891,860 B1 | 2/2018 | Delgado et al. | |
| 10,509,701 B2 * | 12/2019 | Tamura | G06F 16/162 |
| 10,649,858 B2 | 5/2020 | Braddy et al. | |
| 2003/0088650 A1 | 5/2003 | Fassold et al. | |
| 2011/0283113 A1 | 11/2011 | Moffat et al. | |
| 2012/0130949 A1 | 5/2012 | Picken et al. | |
| 2012/0131293 A1 | 5/2012 | Benhase et al. | |
| 2013/0066930 A1 * | 3/2013 | Kamei | G06F 3/061 707/823 |
| 2013/0185509 A1 | 7/2013 | Golosovker et al. | |
| 2013/0185555 A1 * | 7/2013 | Wang | G06F 3/067 713/165 |
| 2013/0333042 A1 | 12/2013 | Saika | |
| 2014/0325383 A1 | 10/2014 | Brown et al. | |
| 2015/0006495 A1 * | 1/2015 | Wang | G06F 16/122 707/695 |
| 2015/0066858 A1 | 3/2015 | Sabdar et al. | |
| 2015/0067442 A1 | 3/2015 | Shiozawa | |
| 2015/0088821 A1 | 3/2015 | Blea et al. | |
| 2015/0287417 A1 | 10/2015 | Disch et al. | |
| 2015/0356108 A1 | 12/2015 | Kamei et al. | |
| 2015/0370641 A1 | 12/2015 | Susairaj et al. | |
| 2016/0088080 A1 * | 3/2016 | Bare, II | H04L 67/1095 709/217 |
| 2016/0162510 A1 | 6/2016 | Hildebrand et al. | |
| 2016/0306840 A1 | 10/2016 | Deshmukh et al. | |
| 2016/0335278 A1 | 11/2016 | Tabaaloute et al. | |
| 2017/0003895 A1 | 1/2017 | Hatfield | |
| 2017/0031932 A1 | 2/2017 | Berrington et al. | |
| 2017/0060898 A1 * | 3/2017 | Lu | G06F 16/2246 |
| 2017/0075907 A1 | 3/2017 | Goswami et al. | |
| 2017/0091057 A1 * | 3/2017 | Ramasubramaniam | G06F 11/2082 |
| 2017/0116298 A1 | 4/2017 | Ravipati et al. | |
| 2017/0195849 A1 | 7/2017 | ??Sterlund | |
| 2017/0315739 A1 | 11/2017 | Ratra et al. | |
| 2018/0173554 A1 | 6/2018 | CaraDonna et al. | |

OTHER PUBLICATIONS

U.S. Appl. No. 15/721,311, Non-final Office Action dated Jun. 18, 2021, 15 pages.

* cited by examiner

360

RECEIVING A REQUEST TO COPY AT LEAST TWO SOURCE FILES FROM A SOURCE STORAGE DEVICE TO A DESTINATION STORAGE DEVICE ~ 362

IDENTIFYING (I) THAT THE AT LEAST TWO SOURCE FILES ARE MEMBERS OF A CLONE RELATIONSHIP, AND (II) THE SOURCE STORAGE DEVICE AND THE DESTINATION STORAGE DEVICE SUPPORT FILE CLONING ~ 364

ESTABLISHING, WITHIN THE DESTINATION STORAGE DEVICE, AT LEAST TWO DESTINATION FILES THAT ARE BASED ON THE AT LEAST TWO SOURCE FILES, WHERE THE CLONE RELATIONSHIP OF THE AT LEAST TWO SOURCE FILES IS MAINTAINED BETWEEN THE AT LEAST TWO DESTINATION FILES ~ 366

482 RECEIVING A REQUEST TO BACK UP AT LEAST TWO SOURCE FILES FROM A SOURCE STORAGE DEVICE TO A DESTINATION STORAGE DEVICE

484 DETERMINING (I) THE AT LEAST TWO SOURCE FILES ARE MEMBERS OF A CLONE RELATIONSHIP, (II) THE SOURCE STORAGE DEVICE SUPPORTS FILE CLONING, AND (III) THE DESTINATION STORAGE DEVICE DOES NOT SUPPORT FILE CLONING

486 ESTABLISHING, WITHIN THE DESTINATION STORAGE DEVICE, DESTINATION FILES THAT CORRESPOND TO THE AT LEAST TWO SOURCE FILES

488 UPDATING METADATA ASSOCIATED WITH EACH DESTINATION FILE IN ACCORDANCE WITH THE CLONE RELATIONSHIP

490 RECEIVING A REQUEST TO RESTORE THE DESTINATION FILES TO THE SOURCE STORAGE DEVICE

492 RESTORING, IN ACCORDANCE WITH THE METADATA, THE DESTINATION FILES TO THE SOURCE STORAGE DEVICE WITH THE CLONE RELATIONSHIP INTACT

*FIG. 4H*

TECHNIQUES FOR PRESERVING CLONE RELATIONSHIPS BETWEEN FILES

CROSS-REFERENCE TO RELATED APPLICATIONS

The present application claims the benefit of U.S. Provisional Application No. 62/514,733, entitled "TECHNIQUES FOR PRESERVING CLONE RELATIONSHIPS BETWEEN FILES," filed Jun. 2, 2017, the content of which is incorporated herein by reference in its entirety for all purposes.

FIELD

The described embodiments set forth techniques for preserving clone relationships between files at a computing device. In particular, the techniques involve identifying clone relationships between files in conjunction with performing operations (e.g., copies, backups, restores, etc.) on the files where it can be beneficial to preserve the clone relationships between the files.

BACKGROUND

Modern file systems can utilize a "copy-on-write" approach with respect to managing the creation and modification of files within a given computing device. For example, the copy-on-write approach can enable an original file to be "cloned" (i.e., logically duplicated) and refer entirely back to the same data of the original file so long as the original file and the cloned file remain unmodified. At this juncture, the original file and the cloned file are referred to as "perfect clones" of one another. In turn, when either the original file or the cloned file is modified, the modified portion of the file can be written into a new area of memory, and the file can be updated to refer (at least in part) to the new area of memory. At this juncture, the original file and the cloned file are referred to as "partial clones" of one another, as they still share at least some subset of data. In this manner, the overall storage space consumption within the computing device can remain highly efficient, especially in scenarios where files are regularly cloned and minimally modified (e.g., edited photos/videos, modified databases, etc.).

Despite the various benefits that are afforded using the copy-on-write approach, several drawbacks unfortunately exist, especially with respect to the manner in which cloned files are copied/backed up. Consider, for example, a scenario in which two cloned files—"A" and "B" (e.g., where "B" is a clone of "A")—are copied from a source storage device to a destination storage device. In this example, complete copies of the files "A" and "B" will be copied from the source storage device to the destination storage device, even in situations where file cloning is supported by the destination storage device. Consequently, the space consumption efficiency (normally afforded by the clone relationship on the source storage device) is eliminated on the destination storage device, which is undesirable.

Consider an additional scenario in which the files "A" and B" are backed up to a destination storage device that does not support file cloning, e.g., a network drive that serves as a backup destination for different computing devices. In this scenario, complete copies of the files "A" and "B" are copied to the destination storage device, and no annotation is made within the destination storage device that these files are clones of one another (on the source storage device). Consequently, when a backup procedure is performed, complete copies of the files "A" and "B" are restored back to the source computing device, which can potentially cause a variety of problems. For example, after a restoration is performed, an expected amount of storage space (previously afforded by the clone relationships) may no longer be available, thereby degrading the overall user experience. In another example, it may be impossible for a restoration to be completed when the backed-up data on the destination storage device exceeds the available storage space on the source storage device (e.g., as a result of losing the storage space efficiency through the clone relationships). In this example, a user can be forced to selectively restore his or her files—or upgrade the size of their source storage device—which is highly undesirable and unacceptable.

SUMMARY

The described embodiments set forth techniques for preserving clone relationships between files at a computing device.

According to some embodiments, a method is disclosed for identifying clone relationships between a plurality of files at a computing device. In particular, the method can include a first step of receiving a request to perform an operation (e.g., a copy operation, a backup operation, etc.) on the plurality of files. A next step of the method can include, for each file that is identified as a cloned file: entering information about each extent of a plurality of extents of the file into a data structure, where the information includes (i) an identifier of the file, (ii) a logical offset of the extent, (iii) a physical block offset of the extent, and (iv) a number of physical blocks of the extent. A next step of the method can include sorting the data structure based on the physical block offsets of the extents. Finally, the method can include identifying clone relationships between the files based on the information about the files—e.g., overlapping extents—included in the data structure.

According to some embodiments, another method is disclosed for retaining clone relationships between files when performing copy operations between storage devices that support file cloning. In particular, the method can include a first step of receiving a request to copy at least two source files from a source storage device to a destination storage device, where (i) the at least two source files are members of a clone relationship, and (ii) both the source storage device and the destination storage device support file cloning. Additionally, the method can include the step of establishing, within the destination storage device, at least two destination files that are based on the at least two source files, where the clone relationship of the at least two source files is maintained between the at least two destination files.

According to some embodiments, an additional method is disclosed for retaining clone relationships between files when performing backup and restore operations at a computing device. In particular, a first step of the method can include receiving a request to back up at least two source files from a source storage device to a destination storage device, where: (i) the at least two source files are members of a clone relationship, (ii) the source storage device supports file cloning, and (iii) the destination storage device does not support file cloning. A next step of the method can involve establishing, within the destination storage device, destination files that correspond to the at least two source files. A next step of the method can involve updating metadata associated with each destination file in accordance with the clone relationship. In turn, an additional step of the method can involve receiving a request to restore the destination files to the source storage device (or to another storage device), and restoring, in accordance with the metadata, the destination files to the source storage device with the clone relationship intact.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the invention will become apparent from the following detailed description taken in conjunction with the accompanying drawings that illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

FIGS. 3A-3F illustrate conceptual diagrams of an example scenario in which a file system manager preserves clone relationships between files that are being copied between storage devices that support file cloning, according to some embodiments.

FIGS. 4A-4H illustrate conceptual diagrams of an example scenario in which a file system manager preserves clone relationships between files when backing up and restoring the files between a source storage device (that supports file cloning) and a destination storage device that does not support file cloning, according to some embodiments.

DETAILED DESCRIPTION

Figure 1:
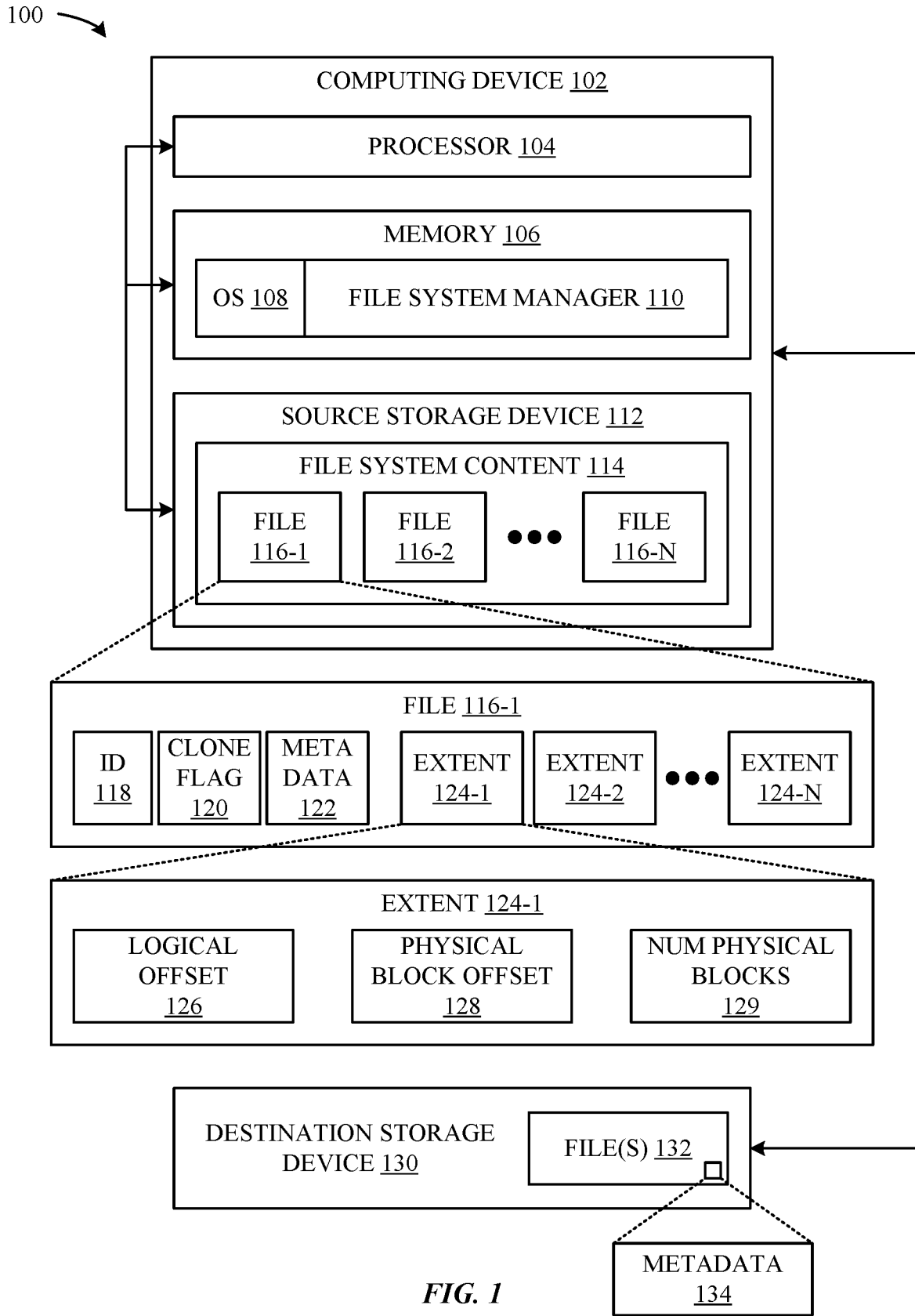
FIG. 1 illustrates a system diagram of a computing device that can be configured to perform the various techniques described herein, according to some embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The described embodiments set forth techniques for preserving clone relationships between files at a computing device. In particular, the techniques involve identifying clone relationships between files in conjunction with performing operations (e.g., copies, backups, restores, etc.) on the files where it can be beneficial to preserve the clone relationships between the files.

According to some embodiments, a technique is disclosed for identifying clone relationships between a plurality of files at the computing device. In particular, the technique can be implemented by a file system manager implemented on the computing device, and can be invoked in conjunction with receiving a request to perform an operation (e.g., a copy operation, a backup operation, etc.) on the plurality of files. In turn, the file system manager can, for each file that is identified as a cloned file, enter information about each extent of a plurality of extents of the file into a data structure. According to some embodiments, the information can include (i) an identifier of the file, (ii) a logical offset of the extent, (iii) a physical block offset of the extent, and (iv) a number of physical blocks of the extent. Next, the file system manager can sort the data structure based on the physical block offsets of the extents to enable the file system manager to efficiently identify overlaps (i.e., clone relationships) between the files that are identified as cloned files. Finally, the file system manager can identify clone relationships between the files based on the overlaps that are gleaned from the information stored in the data structure.

Additionally, the file system manager can be configured to retain clone relationships between files when performing copy operations at the computing device from a source storage device that supports file cloning to a destination storage device that also supports file cloning. For example, the file system manager can receive a request to copy at least two source files from a source storage device to a destination storage device, where the at least two source files are members of a clone relationship. In turn, the file system manager can establish, within the destination storage device, at least two destination files that are based on the at least two source files, where the clone relationship of the at least two source files is maintained between the at least two destination files within the destination storage device.

Additionally, the file system manager can be configured to retain clone relationships between files when performing backup and restore operations using a destination storage device that does not support file cloning. In particular, the file system manager can receive a request to back up at least two source files from a source storage device to the destination storage device, where the at least two source files are members of a clone relationship within the source storage device. In turn, the file system manager can establish, within the destination storage device, destination files that correspond to the at least two source files. Additionally, the file system manager can involve updating metadata associated with the destination files in accordance with the clone relationship so that the clone relationship can be restored at a later time (e.g., during a restore operation). In particular, the file system manager can receive a request to restore the destination files to the source storage device (or to another storage device), and restore, in accordance with the metadata, the destination files to the source storage device with the clone relationship intact.

A more detailed discussion of these techniques is set forth below and described in conjunction with FIGS. 1-5, which illustrate detailed diagrams of systems and methods that can be used to implement these techniques.

FIG. 1 illustrates a block diagram 100 of different components of a computing device 102 that can be configured to implement the various techniques described herein, according to some embodiments. More specifically, FIG. 1 illustrates a high-level overview of the computing device 102, which, as shown, can include at least one processor 104, at least one memory 106, and at least one source storage device 112. According to some embodiments, the processor 104 can be configured to work in conjunction with the memory 106 and the source storage device 112 to enable the computing device 102 to implement the various techniques set forth in this disclosure. According to some embodiments, the source storage device 112 can represent a storage device that is accessible to the computing device 102, e.g., a hard disk drive, a solid-state drive, and hybrid device (e.g., including both hard disk and solid-state drives), and the like.

As shown in FIG. 1, the source storage device 112 can be configured to store file system content 114 of a file system volume that can be mounted at the computing device 102. For example, the processor 104 can be configured to mount a file system volume that includes an OS 108 that is compatible with the computing device 102. According to some embodiments, the OS 108 can enable a file system manager 110 to execute on the computing device 102, where the file system manager 110 can be involved in the clone preservation techniques described herein. As is well-understood, the OS 108 can also enable a variety of processes to execute on the computing device 102, e.g., OS daemons, native OS applications, user applications, and the like. According to some embodiments, the file system volume can also include user data that is accessible at the computing device 102 by way of the OS 108. However, it is noted that, in some configurations, such user data can instead be stored in a separate file system volume that can be concurrently mounted on the computing device 102 and accessible to the OS 108. According to some embodiments, the file system volumes can be members of a same (or different) logical container and can be configured to utilize the same physical storage space within the source storage device 112. This beneficially provides enhanced flexibility as each file system volume can consume space within the source storage device 112 on an as-needed basis. In addition, each file system volume can be configured to enforce particular configurations (e.g., permissions, ownerships, encryption schemes, fragmentation schemes, etc.) that are independent from the configurations of other file system volumes managed by the computing device 102.

As shown in FIG. 1, the file system content 114 can include a collection of files 116, and each file 116 can include an identifier 118 that can be used to uniquely identify the file 116 within the source storage device 112. Each file 116 can also include a clone flag 120 that indicates whether the file 116 is a member of a clone relationship with at least one other file 116. Each file 116 can also include metadata 122 that can be used to store various information that can be utilized by the file system manager 110 to perform the techniques described herein. Additionally, each file 116 can include one or more extents 124 that describe the layout of the file 116 within the source storage device 112. For example, each extent 124 can include a logical offset of the extent 124 relative to the other extents, which is illustrated in FIG. 1 as a logical offset 126. Additionally, each extent 124 can include a starting physical block address (within the source storage device 112), which is illustrated in FIG. 1 as the physical block offset 128. Additionally, each extent 124 can include a length of successive physical blocks (that follow the starting physical block address), which is illustrated in FIG. 1 as the number of physical blocks 129. In this manner, a single file 116 can be separated into various extents 124 that are stored across different areas of the source storage device 112.

Additionally, the computing device 102 can be configured to communicate with a destination storage device 130 to perform a variety of useful features, including backups of the files 116. In particular, the destination storage device 130 can receive files 116 from the computing device 102 and store the files 116 as files 132 within the destination storage device 130. In this manner, the destination storage device 130 can serve as a backup destination for the computing device 102, where the files 132 are stored in accordance with the various techniques set forth in this disclosure. In particular, and as described in greater detail herein, the files 132 can include metadata 134 that can be used to store various information (e.g., timestamp information, block map information, etc.) that can be utilized by the file system manager 110 to perform the techniques described herein. Additionally, it will be understood that the files 132 can include additional content not illustrated in FIG. 1, such as the content included in each of the files 116 (e.g., file ID, extents, etc.).

Accordingly, FIG. 1 sets forth an overview of different components/entities that can be included in the computing device 102 to enable the embodiments described herein to be properly implemented. A more detailed description of the various functionalities of these components/entities will now be provided below in conjunction with FIGS. 2-5.

Figure 2A:
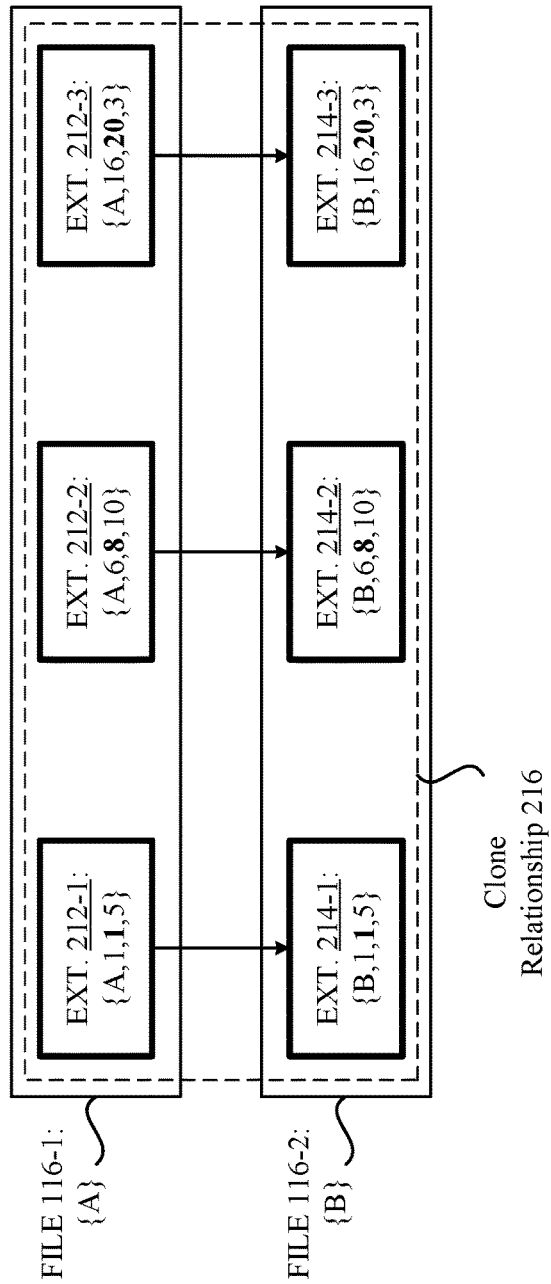
FIGS. 2A-2E illustrate conceptual diagrams of an example scenario in which a file system manager identifies clone relationships between files, according to some embodiments.
Figure 2B:
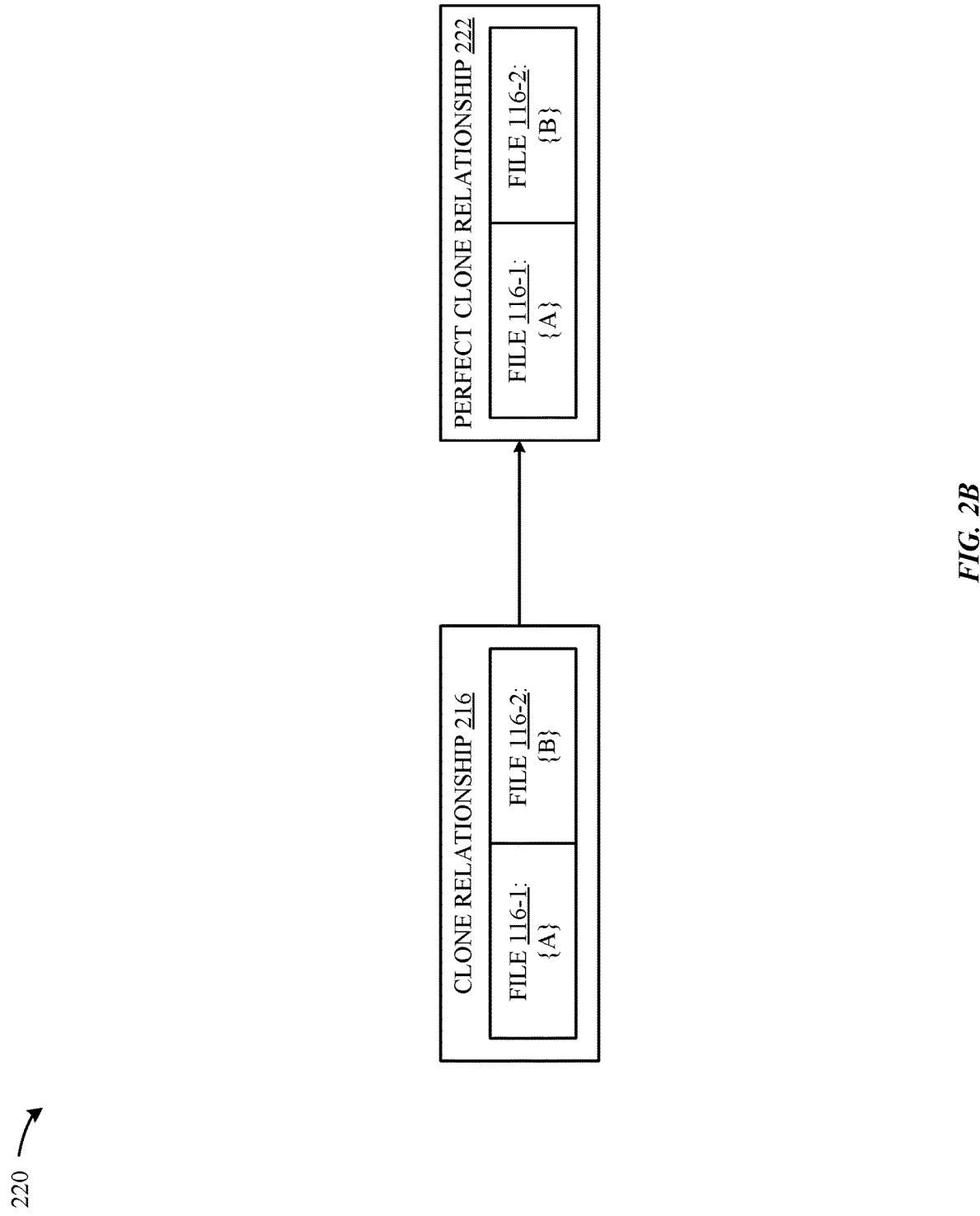

FIGS. 2A-2D illustrate conceptual diagrams of an example scenario in which the file system manager 110 identifies clone relationships between files, according to some embodiments. As shown in FIG. 2A, a first step 210 can involve the file system manager 110 identifying, in conjunction with an operation associated with two files 116—"A" and "B" (e.g., as denoted by the respective identifiers 118)—that these files 116 are flagged as cloned files. As described in greater detail herein, the operation can include a request to copy the files 116 from a source storage device (e.g., the source storage device 112) to a destination storage device (e.g., the destination storage device 130). In another example, the operation can include a request to back up the files 116 from a source storage device (e.g., the source storage device 112) to a destination storage device (e.g., the destination storage device 130). It is noted that the foregoing examples do not represent an exhaustive list of the different operations can provoke the file system manager 110 to identify clone relationships between files 116 within the computing device 102. On the contrary, the file system manager 110 can be configured to perform these operations at any appropriate time (e.g., in conjunction with other events).

In any case, as previously described above in conjunction with FIG. 1, the file system manager 110 can identify, based on the clone flags 120, that (i) the file 116 "A" is a clone, and (ii) the file "B" is a clone. According to some embodiments, the file system manager 110 can be configured to update the clone flags 120 in accordance with different operations that are performed on the files 116 within the computing device 102. For example, when the file 116 "A" is a normal file—i.e., no files are cloned off of the file 116 "A"—the clone flag 120 can be set as "false." At a later time, when the file 116 "B" is created as a cloned file that is based on the file 116 "A", the file system manager 110 can set the respective clone flags 120 for the files 116 "A" and "B" to "true." In this manner, the file system manager 110 can readily identify, at least at a high level, when files 116 are members of a clone relationship. In turn, the file system manager 110 can carry out a series of steps to identify details about the clone relationship—in particular, whether the clone relationship is a perfect or partial clone relationship—which are described below in greater detail.

According to some embodiments, the file system manager 110 can identify details about the clone relationship by analyzing the overlaps in the underlying data of the files 116 "A" and "B". According to some embodiments, to carry out this analysis, the file system manager 110 can begin by inserting information—referred to herein as "block map information"—about the extents 124 of the files 116 "A" and "B" into a data structure (e.g., a tree structure, a linked-list, an array, a hash table, etc.). For example, the data structure can include a group of nodes that are arranged in a tree hierarchy (not illustrated in FIG. 2A), where each node corresponds to a respective extent 124 of one of the files 116 "A" and "B". For example, for a given extent 124, a corresponding node can include (i) an identifier 118 associated with the corresponding file 116 (in which the extent 124 is included), a logical offset 126 associated with the extent 124, a physical block offset 128 associated with the extent 124, and a number of physical blocks 129 associated with the extent 124. An example layout of this information is included within the different extents 124 of the files 116 "A" and "B", which are illustrated in FIG. 2A as the extents 212-1,2,3 (for the file 116 "A") and the extents 214-1,2,3 (for the file 116 "B"). For example, the information "{A,1, 1,5}" within the extent 212-1 indicates that the identifier 118 for the file 116 (associated with the extent 212-1) is "A", the logical offset 126 of the extent 212-1 is one (e.g., the extent 212-1 is the first extent within the file 116 "A"), the physical block offset 128 is one (e.g., a first physical block within the source storage device 112), and the number of physical blocks 129 is five (e.g., the extent 212-1 is five physical blocks long). It will be understood that the example layouts illustrated in FIGS. 2A and 2D (described below) include exemplary numbers that have been minimized in the interest of simplicity, e.g., the physical block offset 128 normally will refer to a complete (e.g., 64-bit) memory address within the source storage device 112.

Accordingly, after the file system manager 110 populates the data structure with nodes based on the different extents 124 of the files 116 "A" and "B", the file system manager 110 can sort the nodes based on the physical block offsets 128 included in the nodes. At this juncture, the file system manager 110 can efficiently identify the overlapping extents 124 between the files 116 "A" and "B" based on the information included within the sorted nodes (e.g., the physical block offsets 128 and the number of physical blocks 129). In this manner, the file system manager 110 can effectively identify when two or more files 116 are members of a clone relationship. For example, as shown in FIG. 2A, the file system manager 110 identifies that each of the extents 124 of the file 116 "A" (i.e., the extents 212-1,2,3) perfectly overlap the extents 124 of the file 116 "B" (i.e., the extents 214-1,2,3). In turn, the file system manager 110 can identify that the files 116 "A" and "B" are members of a clone relationship 216, as illustrated in FIG. 2A.

At this juncture, the file system manager 110 can identify whether any additional files 116 are included in the clone relationship 216 between the files 116 "A" and "B". However, in the interest of maintaining simplicity in this example, the clone relationship 216 is exclusive to the files 116 "A" and "B", as illustrated at step 220 in FIG. 2B. For example, upon determining that (1) the files 116 "A" and "B" perfectly overlap one another, and (2) no additional files 116 overlap the files 116 "A" and "B", the file system manager 110 can convert the clone relationship 216 into a perfect clone relationship 222 that includes the files 116 "A" and "B". In turn, and as described below in greater detail, this information can be utilized to increase the efficiency by which the operation (associated with step 210) is performed.

Figure 2C:
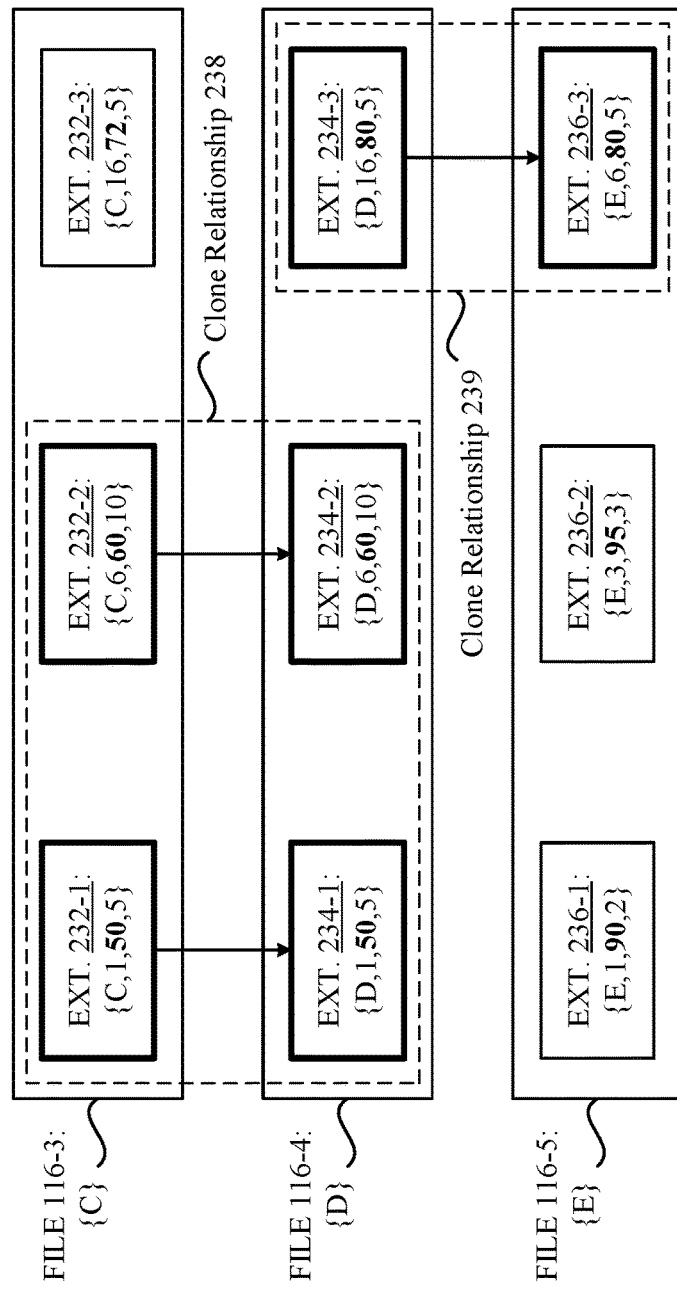
Figure 2D:
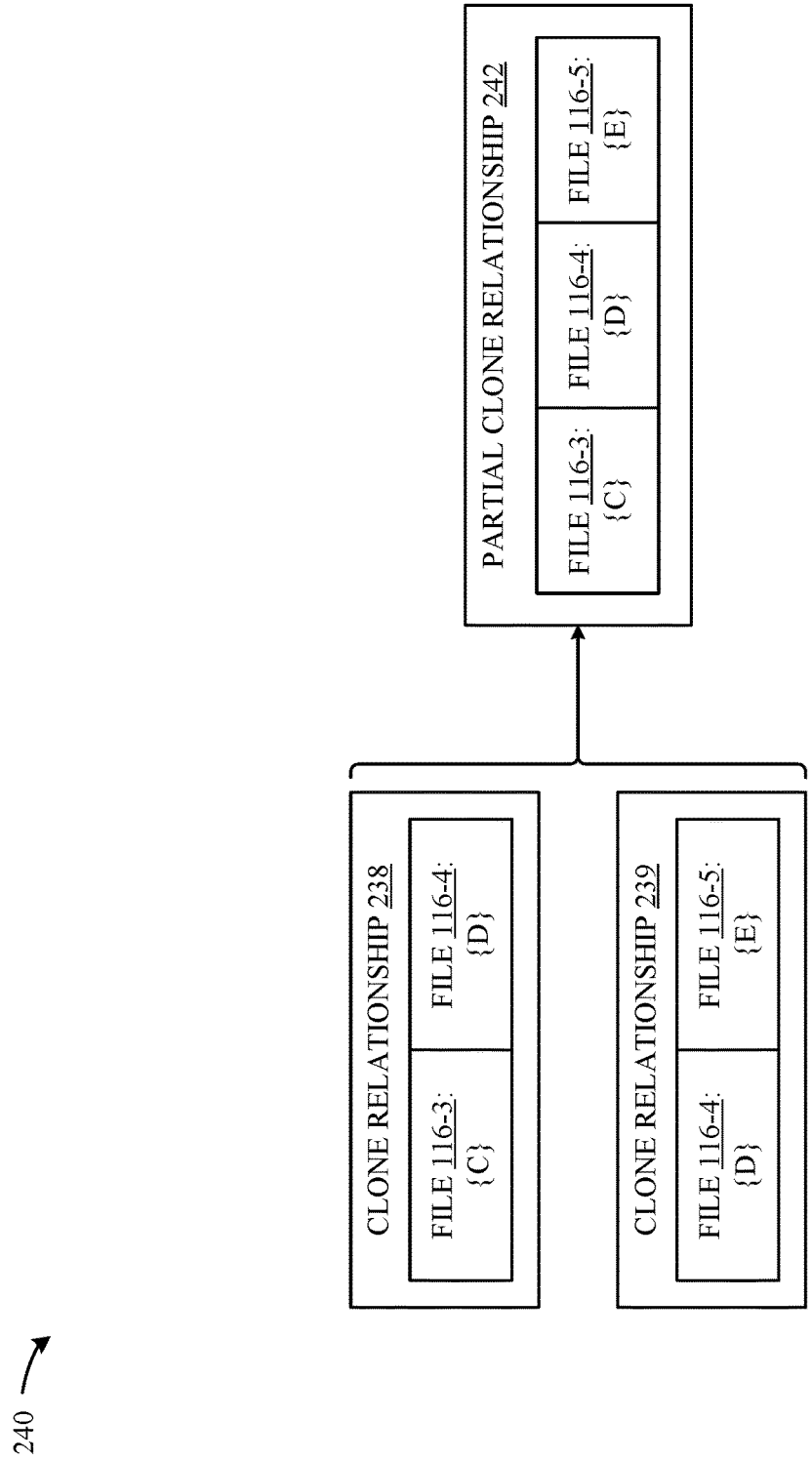

Additionally, as previously described herein, the file system manager 110 can be configured to identify partial clone relationships between files 116. Accordingly, FIG. 2C illustrates an example scenario in which the file system manager 110 can identify a partial clone relationship between three different files 116. For example, as shown in FIG. 2C, a step 230 can involve the file system manager 110 identifying, in conjunction with an operation associated with the files 116 "C", "D", and "E", that these files are flagged as cloned files within the computing device 102 (e.g., utilizing the clone flags 120, as described above in conjunction with FIG. 2A). In turn, the file system manager 110 can utilize a data structure to effectively identify overlaps between the extents 124 of the files 116 "C", "D", and "E" (e.g., as also described above in conjunction with FIG. 2A). For example, as illustrated in FIG. 2C, two of the extents 124 of the file 116 "C"—illustrated in FIG. 2C as extents 232-1,2—overlap the extents 124 of the file 116 "D"—illustrated in FIG. 2C as the extents 234-1,2. In this regard, the file system manager 110 identifies a clone relationship 238 between the files 116 "C" and "D" because at least a subset of their corresponding extents 124 overlap. Notably, no overlap exists between the extent 232-3 (of the file 116 "C") and the extent 234-3 (of the file 116 "D"). Next, the file system manager 110 identifies that one of the extents 124 of the file 116 "D"—illustrated in FIG. 2C as the extent 234-3—overlaps one of the extents 124 of the file 116 "E"—illustrated in FIG. 2C as the extent 236-3. In this regard, the file system manager 110 identifies a clone relationship 239 between the files 116 "D" and "E" because at least a subset of their corresponding extents 124 overlap. Additionally, the extents 236-1,2 of the file 116 "E" do not overlap with any of the extents 124 of the file 116 "D" (as well as the extents 124 of the file 116 "C").

At this juncture, the file system manager 110 can identify whether any additional files 116 are included in (1) the clone relationship 238 between the files 116 "C" and "D", or (2) the clone relationship 239 between the files 116 "D" and "E". However, in the interest of maintaining simplicity in this example, the clone relationships 238/239 are exclusive to the files 116 "C", "D", and "E", as illustrated at step 240 in FIG. 2D. For example, upon determining that (1) the files 116 "C" and "D" partially overlap one another, and (2) the files 116 "D" and "E" partially overlap one another, the file system manager 110 can merge the clone relationships 238 and 239 into a partial clone relationship 242 that includes the files 116 "C", "D", and "E". In turn, and as described below in greater detail, this information can be utilized to increase the efficiency by which the operation (associated with step 230) is performed.

Accordingly, FIGS. 2A-2D provide a detailed breakdown of example scenarios in which the file system manager 110 identifies both perfect and partial clone relationships between files 116. A high-level breakdown of these various techniques will now be discussed below in conjunction with FIG. 2E, with reference to FIGS. 2A-2D.

Figure 2E:
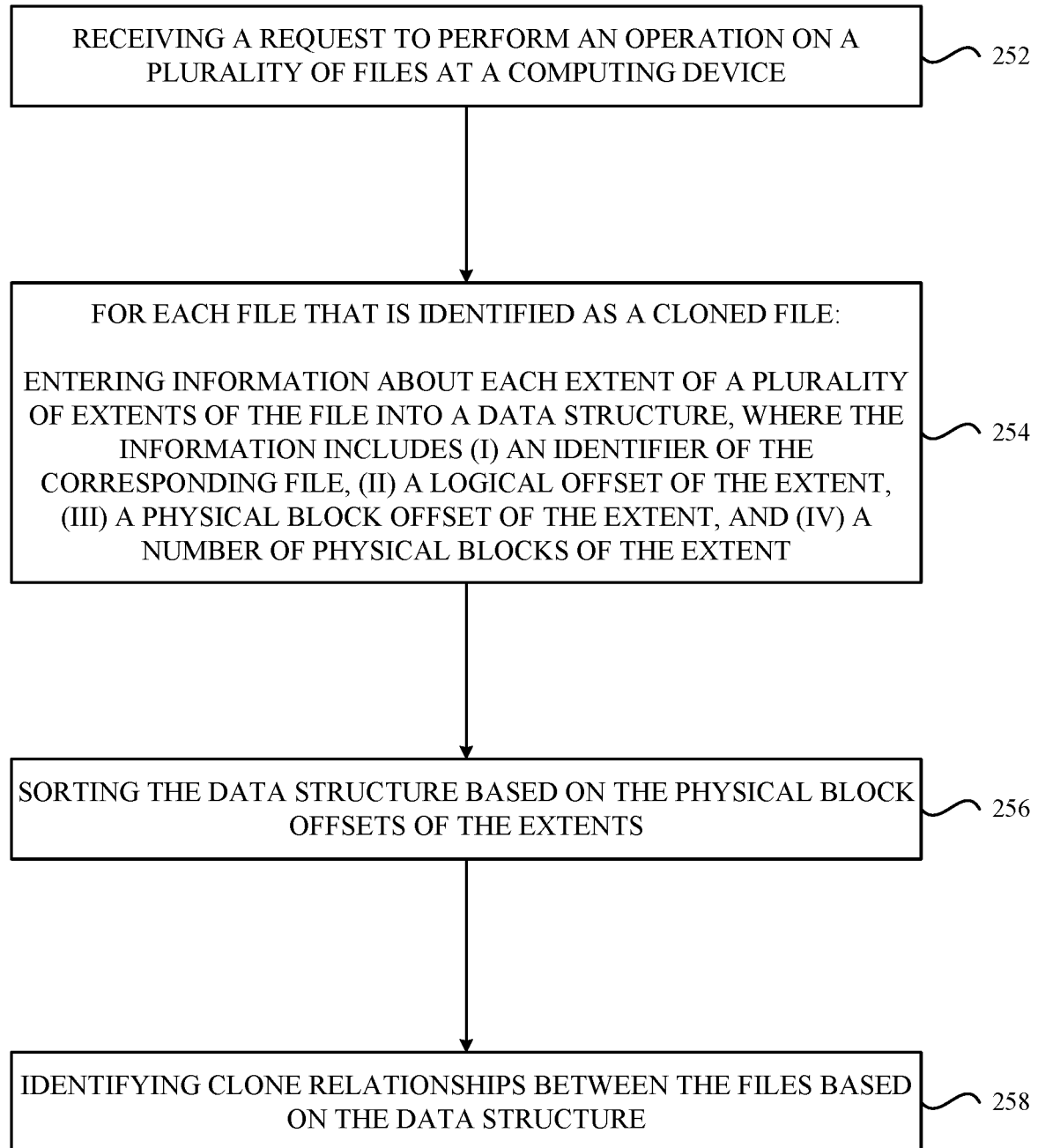

FIG. 2E illustrates a method 250 for identifying clone relationships between files 116, according to some embodiments. As shown in FIG. 2E, the method 250 begins at step 252, where the file system manager 110 receives a request to perform an operation on a plurality of files 116 at the computing device 102 (e.g., as described above in conjunction with FIG. 2A). At step 254, the file system manager 110 performs the following for each file 116 that is identified as a cloned file 116: entering information about each extent 124 of a plurality of extents 124 of the file 116 into a data structure, where the information includes (i) an identifier 118 of the corresponding file 116, (ii) a logical offset 126 of the extent 124, (iii) a physical block offset 128 of the extent 124, and (iv) a number of physical blocks 129 of the extent 124 (e.g., as described above in conjunction with FIGS. 2A and 2C). At step 256, the file system manager 110 sorts the data structure based on the physical block offsets 128 of the extents 124 (e.g., as described above in conjunction with FIGS. 2A and 2C). Finally, at step 258, the file system manager 110 identifies clone relationships between the files 116 based on the data structure (e.g., as described above in conjunction with FIGS. 2A-2D).

Accordingly, FIGS. 2A-2E provide a detailed breakdown of techniques that can implemented to identify clone relationships between files 116 at the computing device 102. As previously described above, this approach can be used to utilized to preserve clone relationships between files 116 that are being copied from a source storage device (that supports file cloning)—e.g., the source storage device 112—to a destination storage device that supports file cloning—e.g., the destination storage device 130—which is described below in greater detail in conjunction with FIGS. 3A-3F.

Figure 3A:
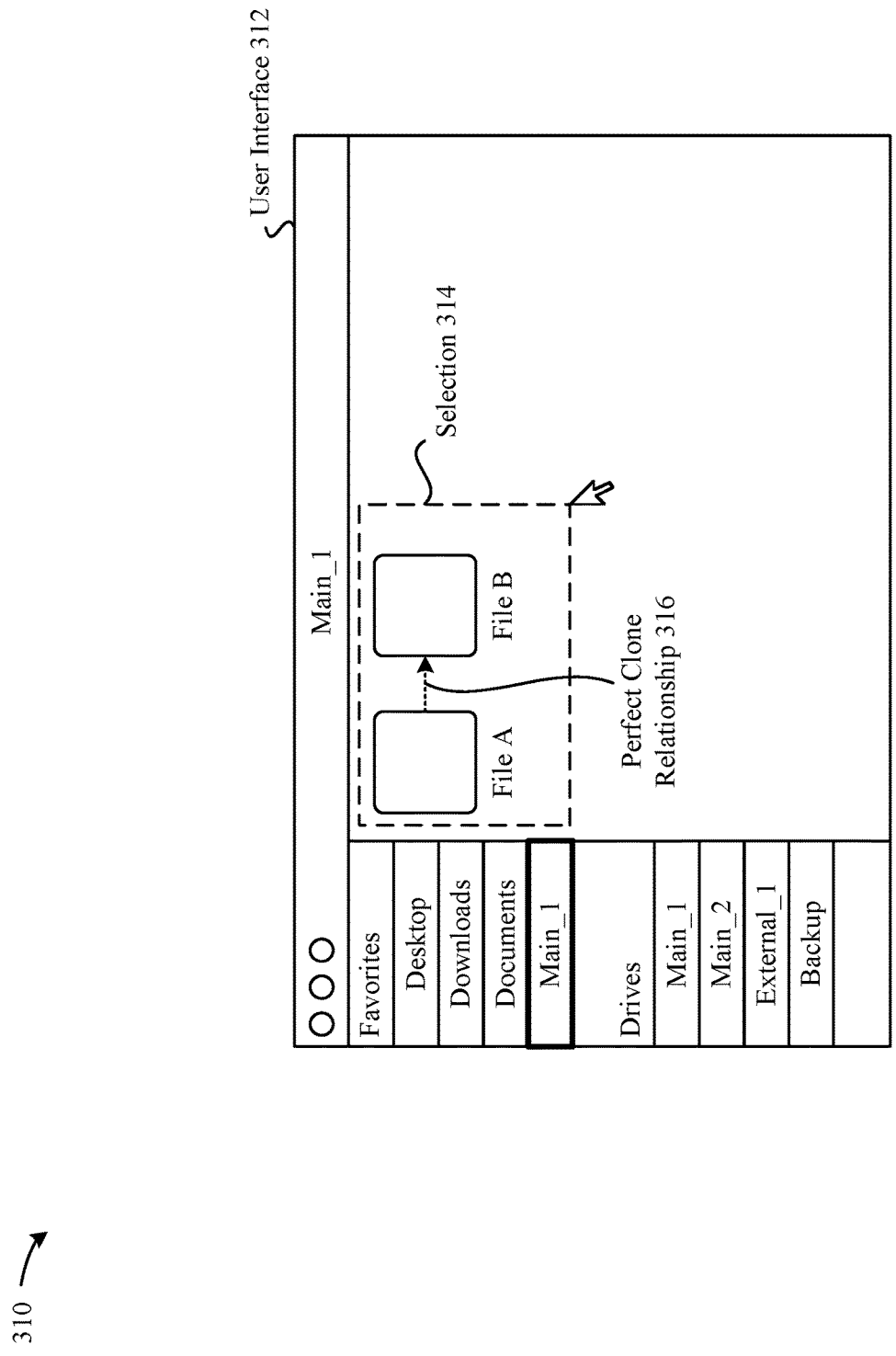
Figure 3B:
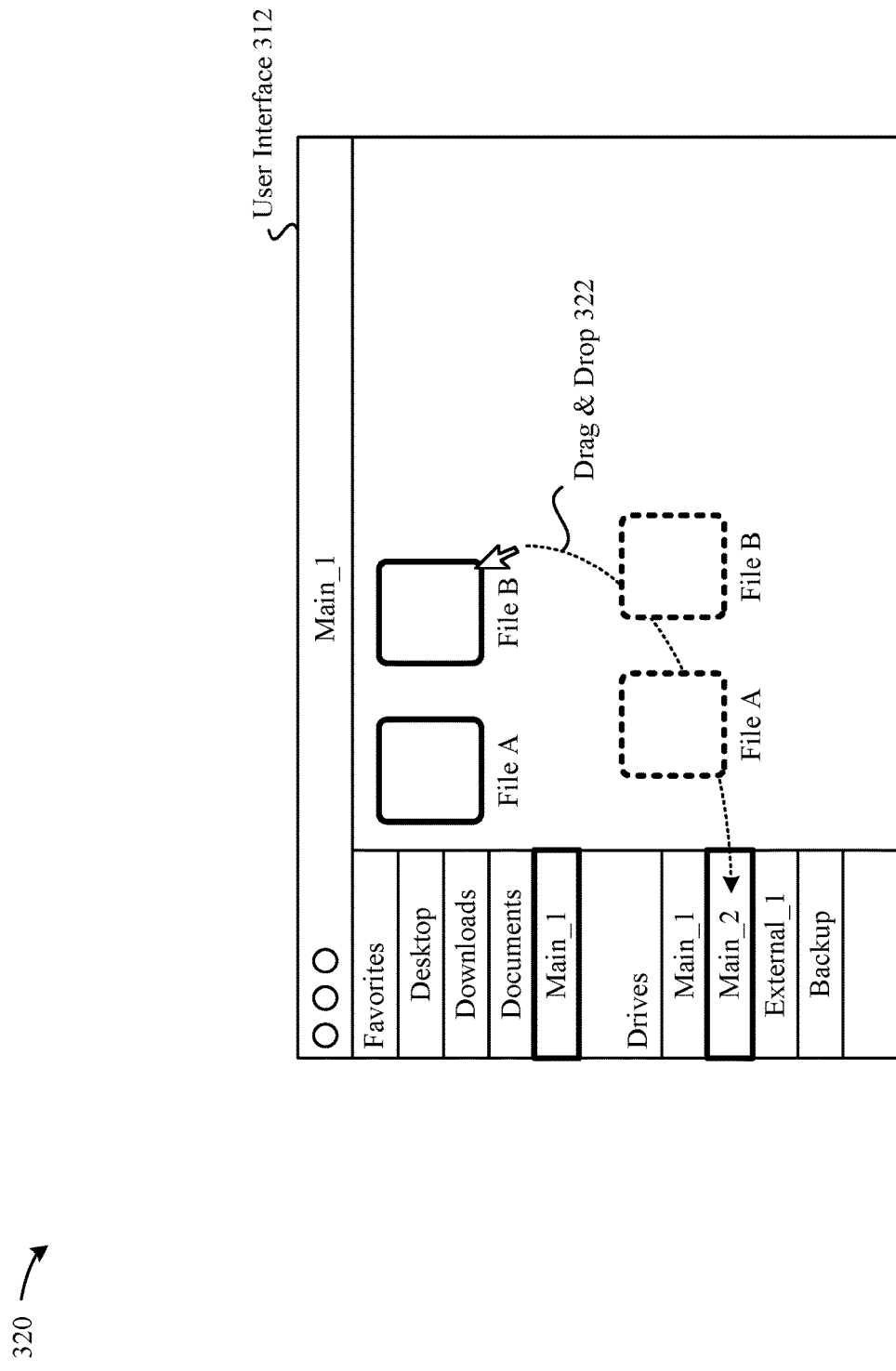

FIGS. 3A-3E illustrate conceptual diagrams of an example scenario in which the file system manager 110 preserves clone relationships between files 116 that are being copied between storage devices that support file cloning, according to some embodiments. As shown in FIG. 3A, a first step 310 can involve the file system manager 110 identifying a selection of a least two source files 116 "A" and "B" stored on a source storage device 112 named "Main_1", where a perfect clone relationship 316 exists between the source files 116 "A" and "B". As shown in FIG. 3A, this can involve a user selecting (e.g., via a selection 314), within a user interface (UI) 312, UI elements that correspond to the source files 116 "A" and "B". The UI 312 can be presented, for example, at a display device with which the computing device 102 is communicably coupled. Next, at step 320 illustrated in FIG. 3B, the file system manager 110 receives a request to copy the source files 116 "A" and "B" from the source storage device 112 "Main_1" to a destination storage device 130 "Main_2". For example, the destination storage device 130 can be included in the computing device 102 (e.g., as a secondary storage device to the source storage device 112), remote to the computing device 102 (e.g., a network-based destination storage device 130), and so on, where the destination storage device 130 "Main_2" supports file cloning. As shown in FIG. 3B, the copy operation can be issued in response to identifying a drag and drop event 322 of the source files 116 "A" and "B" that lands on a UI element that corresponds to the destination storage device 130 "Main_2". It is noted that other approaches can be utilized to invoke the request to copy the source files 116 "A" and "B", e.g., hot keys, context menu selections, and so on.

Figure 3C:
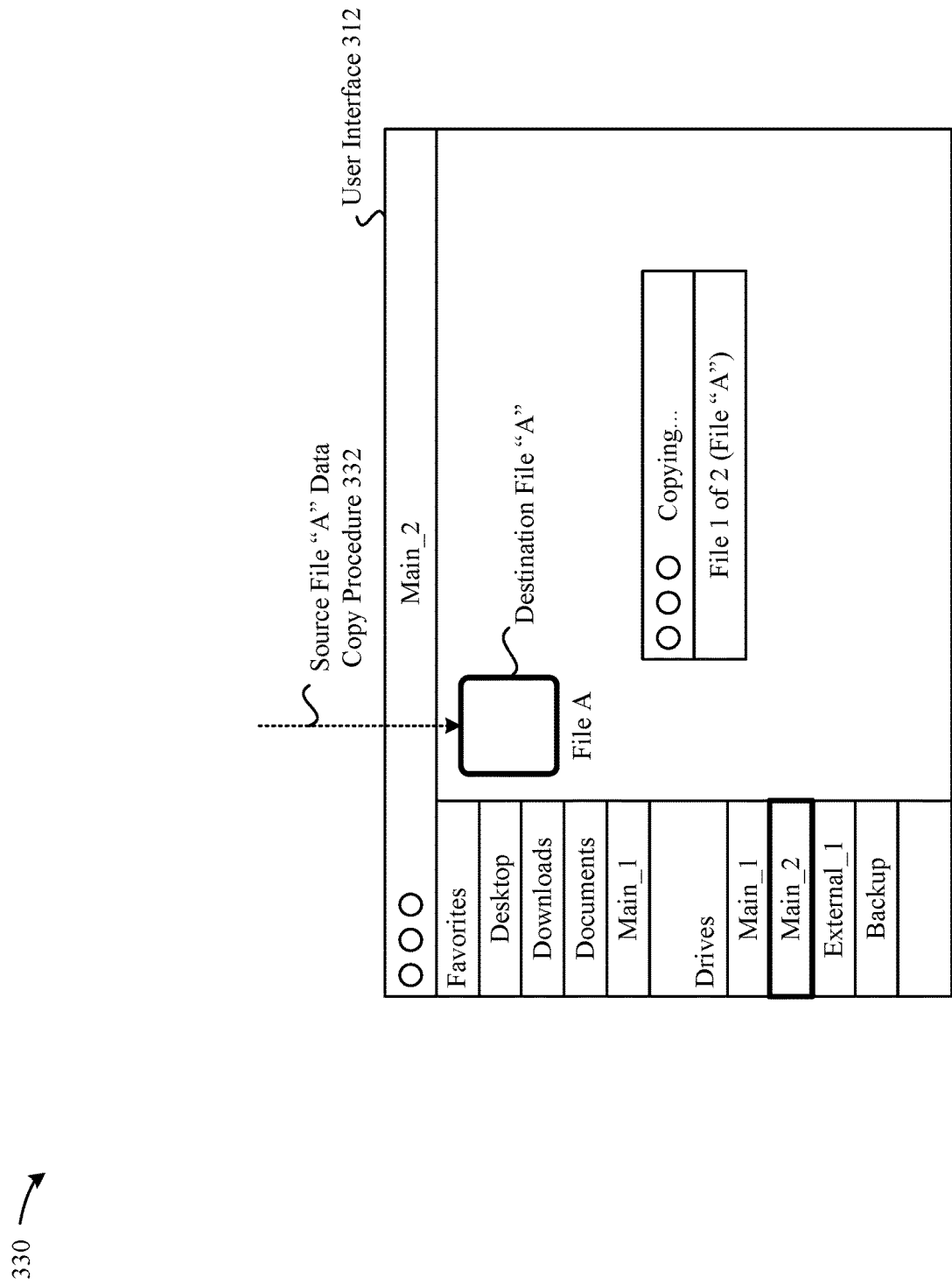

Next, in FIG. 3C, a step 330 involves the file system manager 110 identifying the perfect clone relationship 316 between the source files 116 "A" and "B" (e.g., using the clone discovery techniques described above in conjunction with FIGS. 2A-2E). In this regard, the file system manager 110 can attempt to preserve the perfect clone relationship 316 between the source files 116 "A" and "B" when they are copied to the destination storage device 130 "Main_2" to achieve similar space savings (afforded by the perfect clone relationship 316) within the destination storage device 130 "Main_2". According to some embodiments, to achieve this result, the file system manager 110 can, via a procedure 332, copy data of the source file 116 "A" from the source storage device 112 "Main_1" to the destination storage device 130 "Main_2" to establish a destination file 132 "A" at the destination storage device 130 "Main_2". In this regard, the destination file 132 "A" consumes the same amount of storage space within the destination storage device 130 "Main_2" as the source file 116 "A" within the source storage device 112 "Main_1".

Figure 3D:
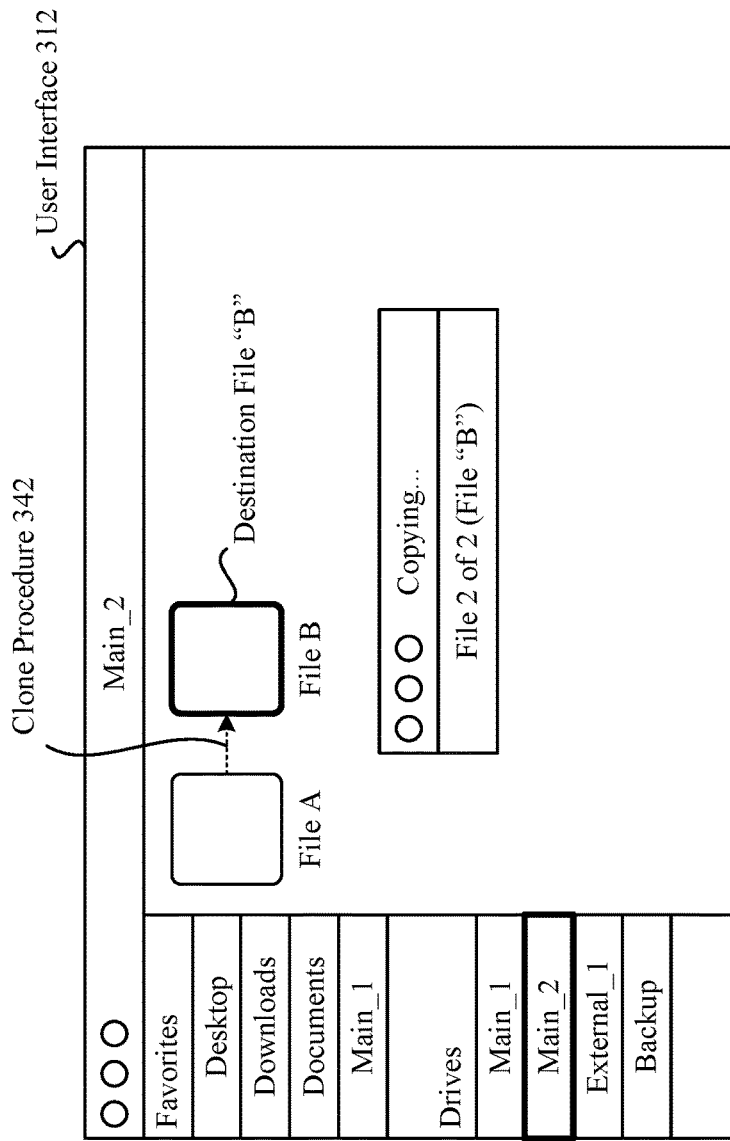
Figure 3E:
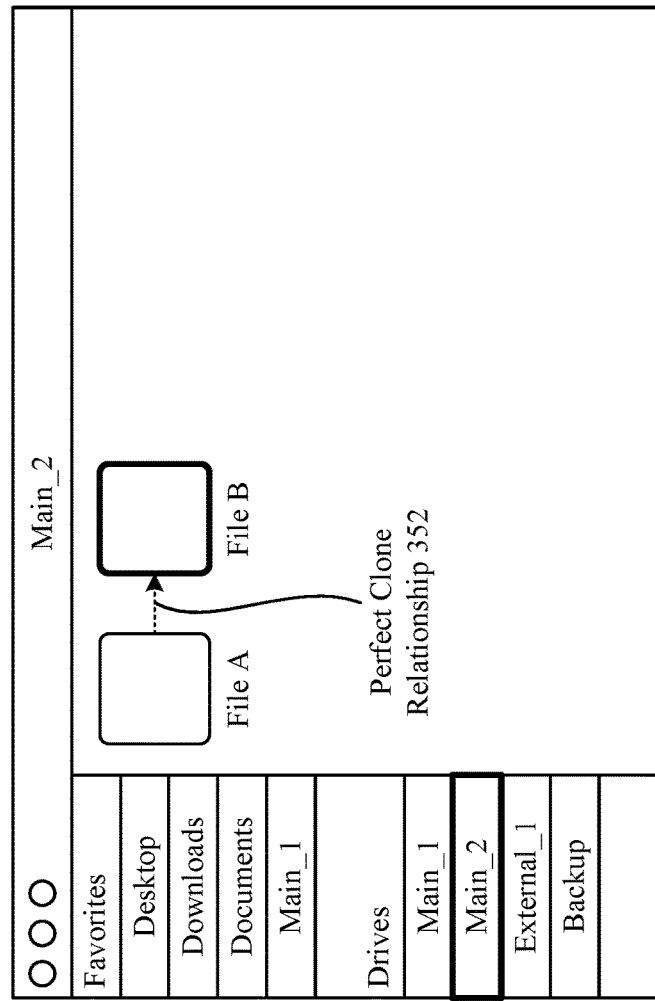

Next, at step 340 in FIG. 3D, the file system manager 110 can, via a procedure 342, clone the destination file 132 "A" at the destination storage device 130 "Main_2" to establish a destination file 132 "B" (within the destination storage device 130 "Main_2") that corresponds to the source file 116 "B" at the source storage device 112. In this regard, the destination file 132 "B" consumes only a small amount of memory, as the underlying data for the destination file 132 "B" is supported by the underlying data of the destination file 132 "A" through the preserved perfect clone relationship. In turn, at step 350 of FIG. 3E, the destination files 132 "A" and "B" exist within the destination storage device 130 "Main_2" with a perfect clone relationship 352 in correlation to the perfect clone relationship 316 between the source files 116 "A" and "B" at the source storage device 112 "Main_1".

Accordingly, FIGS. 3A-3E provide a detailed breakdown of an example scenario in which the file system manager 110 preserves clone relationships between files 116 that are being copied between storage devices that support file cloning. A high-level breakdown of these various techniques will now be discussed below in conjunction with FIG. 3F, with reference to FIGS. 3A-3E.

FIG. 3F illustrates a method 360 for preserving clone relationships between files 116 that are being copied from a source storage device (that supports file cloning) (e.g., the source storage device 112) to a destination storage device that supports file cloning (e.g., the destination storage device 130), according to some embodiments. As shown in FIG. 3F, the method 360 begins at step 362, where the file system manager 110 receives a request to copy at least two source files 116 from the source storage device 112 to the destination storage device 130 (e.g., as described above in conjunction with FIG. 3A). At step 364, the file system manager 110 identifies (i) that the at least two source files 116 are members of a clone relationship, and (ii) the source storage device 112 and the destination storage device 130 support file cloning (e.g., as described above in conjunction with FIG. 3C). At step 366, the file system manager 110 establishes, within the destination storage device 130, at least two destination files 132 that are based on the at least two source files 116, where the clone relationship of the at least two source files 116 is maintained between the at least two destination files (e.g., as described above in conjunction with FIGS. 3D-3E).

Accordingly, FIGS. 3A-3F provide a detailed breakdown of techniques that can implemented to preserve clone relationships between files 116 when performing copy operations between storage devices that support file cloning. Additionally, as previously described above, the embodiments set forth an additional technique that can be used to preserve clone relationships when backing up and restoring files 116 between a source storage device (that supports file cloning) and a destination storage device that does not support file cloning, which is described below in greater detail in conjunction with FIGS. 4A-4H.

Figure 4A:
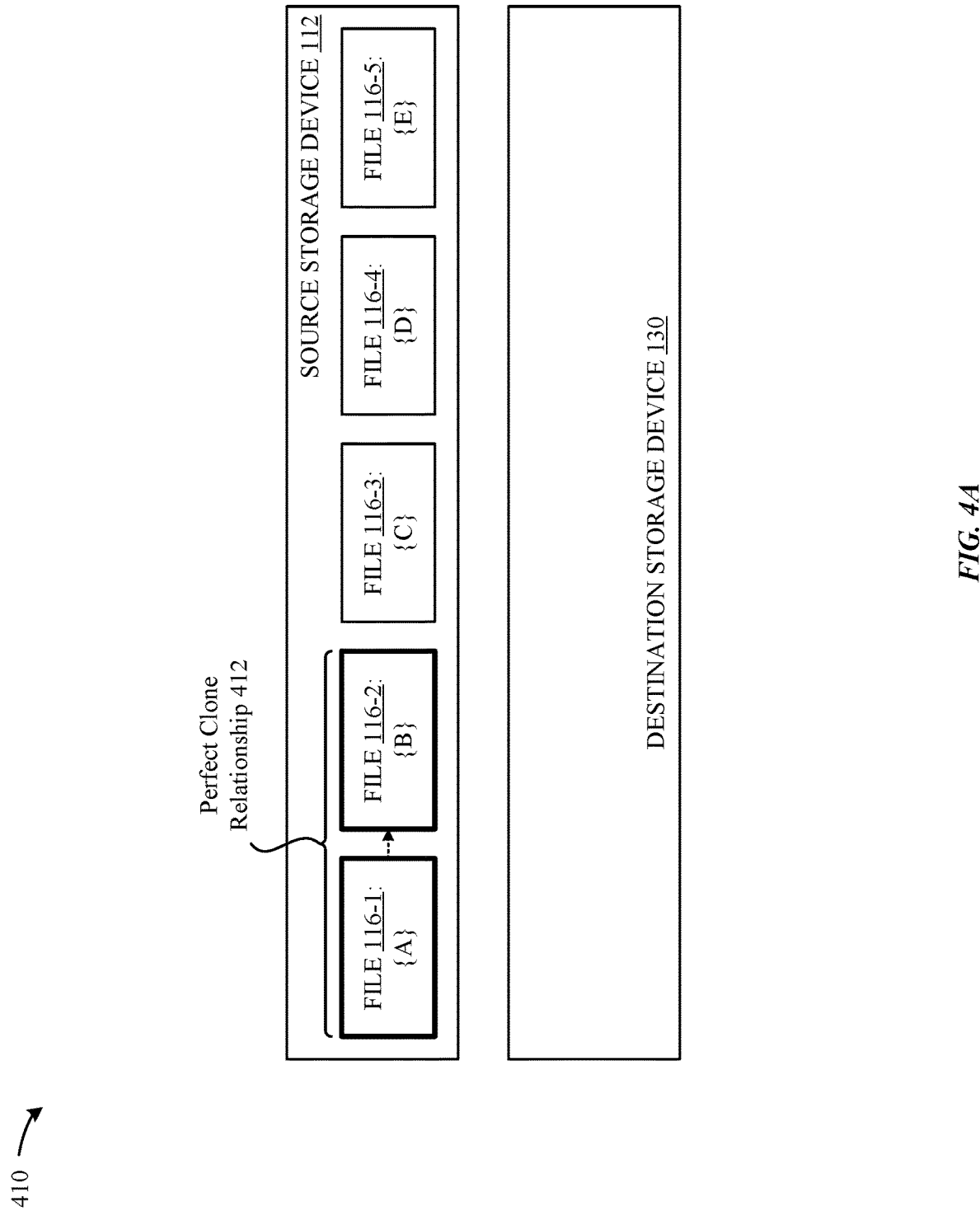

FIGS. 4A-4G illustrate conceptual diagrams of an example scenario in which the file system manager 110 preserves clone relationships when backing up and restoring files between a source storage device (that supports file cloning) (e.g., the source storage device 112) and a destination storage device that does not support file cloning (e.g., the destination storage device 130), according to some embodiments. As shown in FIG. 4A, a first step 410 can involve the file system manager 110 receiving a request to back up the source files 116 "A" and "B" from the source storage device 112 to the destination storage device 130. For example, the request can be issued in response to a periodic backup schedule being triggered, a manual backup being triggered, and so on. To simplify this example scenario, the destination storage device 130 is empty and does not yet include any content (e.g., no backups have occurred in conjunction with the destination storage device 130), as illustrated in FIG. 4A.

As shown in FIG. 4A, step 410 can involve the file system manager 110 identifying that a perfect clone relationship 412 exists between the source files 116 "A" and "B" (e.g., using the techniques described above in conjunction with FIGS. 2A-2E). In response, a next step 420 illustrated in FIG. 4B can involve the file system manager 110 carrying out the backup with the goal of preserving the perfect clone relationship 412 between the source files 116 "A" and "B" within the source storage device 112. However, as noted above, in the example scenario illustrated in conjunction with FIGS. 4A-4H, the destination storage device 130 does not support file cloning. In this regard, file cloning cannot be utilized (e.g., as it was in the example scenario described above in conjunction with FIGS. 3A-3F) at the destination storage device 130 to preserve the perfect clone relationship 412. However, the file system manager 110 can utilize different features that are available on the destination storage device 130, including file "hard-links," that can be used to preserve the perfect clone relationship 412 under a different form within the destination storage device 130.

As a brief aside, it is noted that a hard-link between two files is different than a perfect clone relationship between two files. For example, when two files 132 are hard-linked within the destination storage device 130, any change to one of the files 132 will directly affect the other file 132. For example, if the first file 132 is a word-processing document, and the second file 132 is hard-linked to the first file 132, any changes to the word-processing document will be seen when opening either the first file 132 or the second file 132. Thus, hard-links are distinct from perfect clone relationships, as files that are perfect clones of one another divert onto separate paths after a first change is made to either one of the files, whereupon the perfect clone relationship transitions into a partial clone relationship. Accordingly, the file system manager 110 can utilize hard-links within the destination storage device 130 to preserve perfect clone relationships even when file cloning is not available within the destination storage device 130.

Figure 4B:
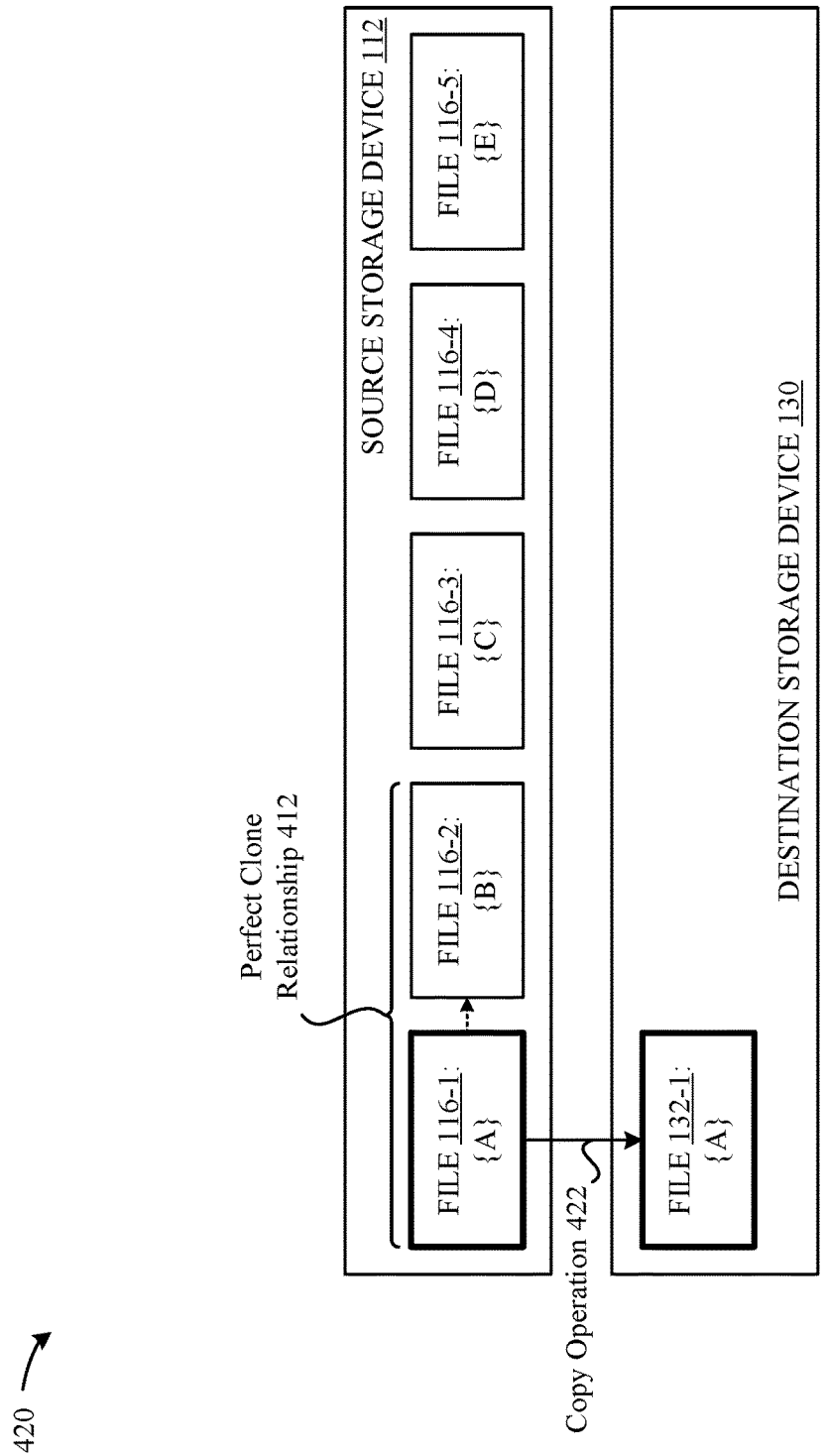
Figure 4C:
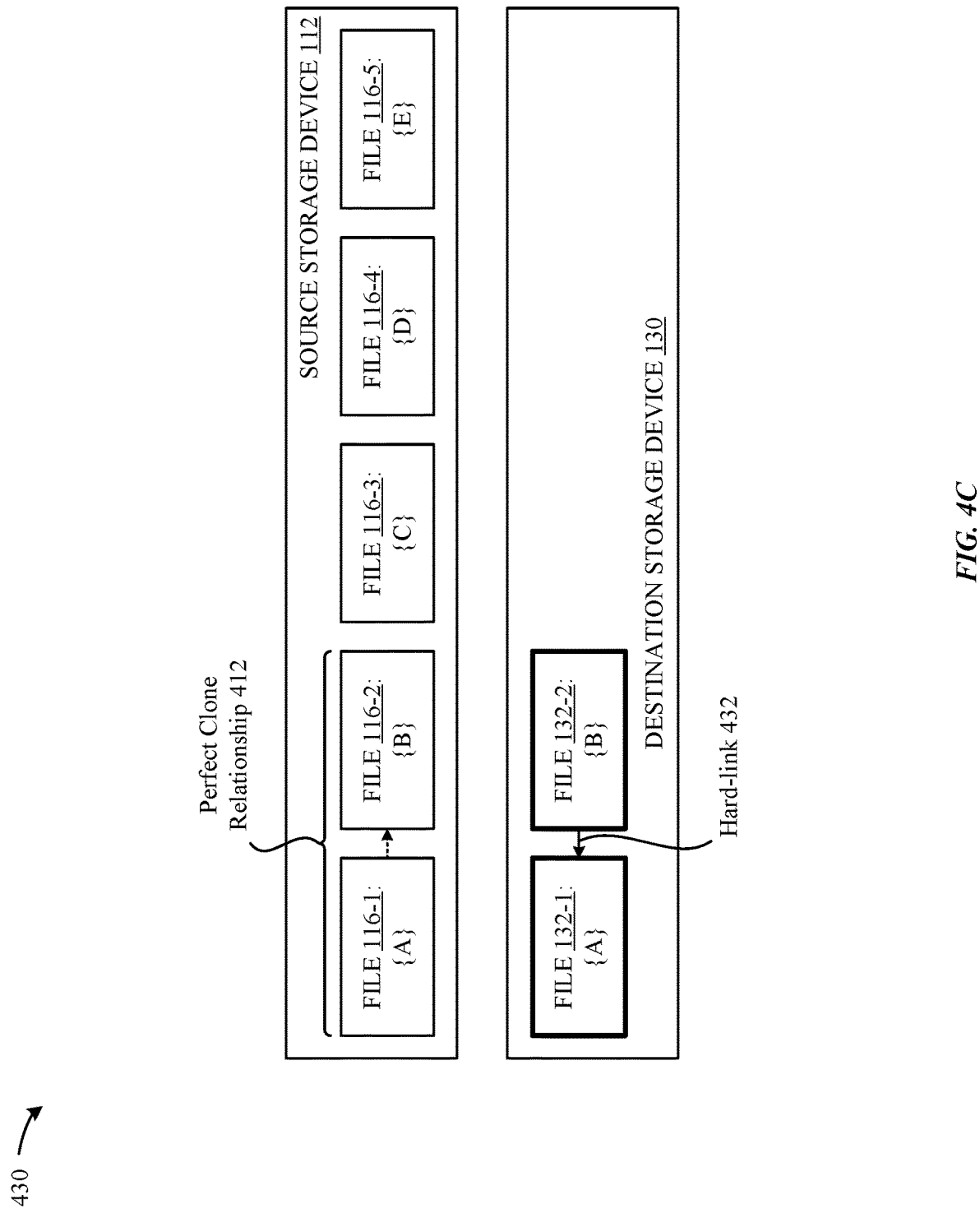

To implement this approach, as shown in FIG. 4B, step 420 can involve the file system manager 110 creating, within the destination storage device 130, a destination file 132 "A" by copying, via a copy operation 422, the content of the source file 116 "A" from the source storage device 112 to the destination storage device 130. In this regard, the storage space consumed by the destination file 132 "A" within the destination storage device 130 matches the storage space consumed by the source file 116 "A" within the source storage device 112, as the destination file 132 "A" is a copy of the source file 116 "A". Next, at step 430 in FIG. 4C, the file system manager 110 creates, within the destination storage device 130, a destination file 132 "B" that is hard-linked (via a hard-link 432) to the destination file 132 "A" (in accordance with the hard-link techniques described above). In this regard, the storage space consumed by the destination file 132 "B" is relatively small, as the destination file 132 "B" primarily references the underlying data of the destination file 132 "A".

Figure 4D:
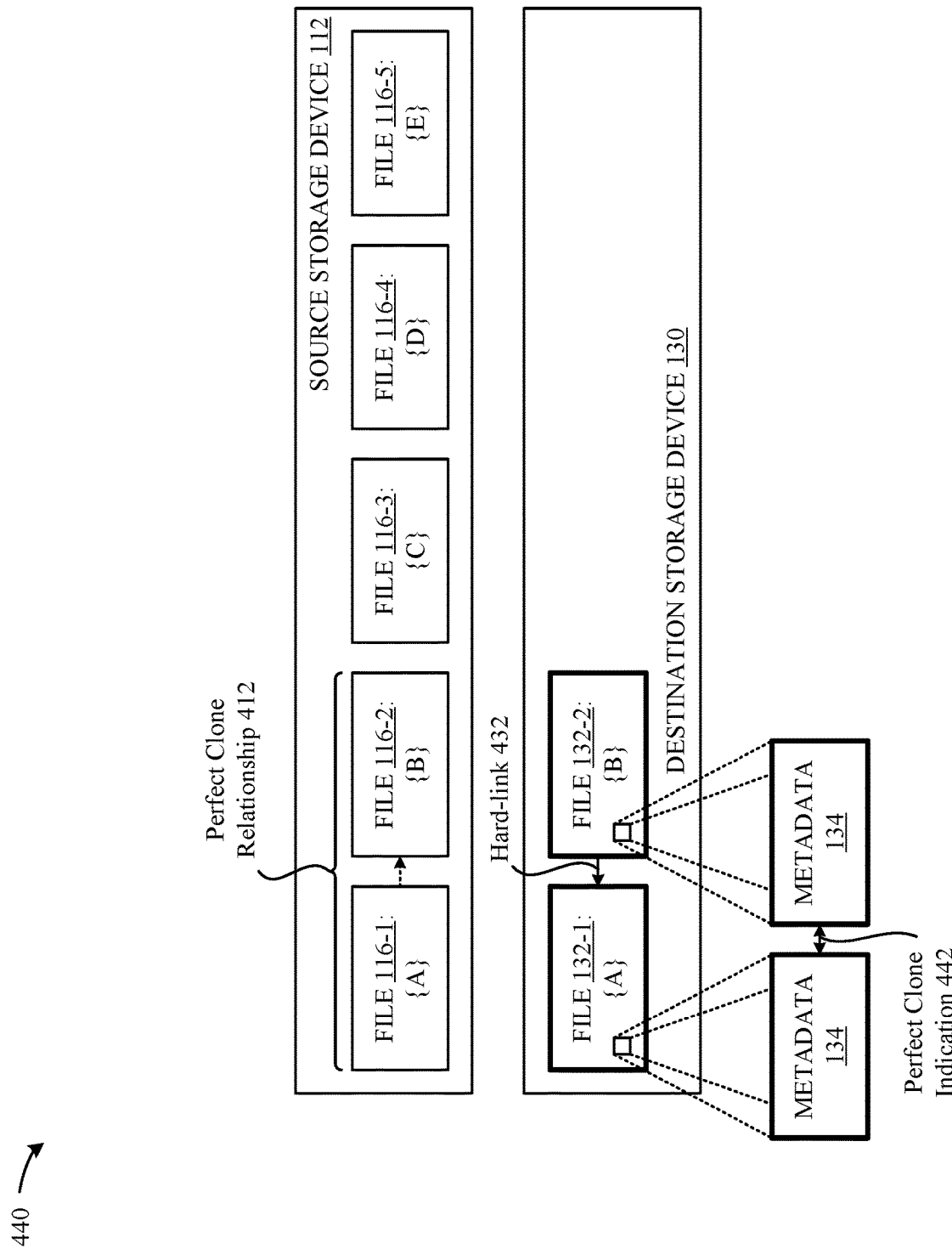

Additionally, the file system manager 110 can note, within the destination storage device 130, that the destination files 132 "A" and "B" do not truly represent hard-linked files when they are subsequently restored to the source storage device 112 (or to another storage device). In particular, and as shown in FIG. 4D, a fourth step 440 can involve the file system manager 110 populating the metadata 134 of one or more of the destination files 132 "A" and "B" to indicate that they are members of the perfect clone relationship 412—not members of the hard-link relationship established within the destination storage device 130. For example, the file system manager 110 can include, within the metadata 134 that corresponds to the destination file 132 "A", the identifier 118 "B" that corresponds to the destination file 132 "B" with which the destination file 132 "A" is hard-linked, or vice-versa. Alternatively, the file system manager 110 can include this information within the metadata 134 for each of the destination files 132 "A" and "B" to increase redundancy (e.g., in case the metadata 134 of one of the destination files 132 "A" and "B" becomes corrupted). In this manner, the file system manager 110 can utilize the metadata 134 to identify the perfect clone indication 442, and effectively re-establish the perfect clone relationship 412 when the destination files 132 "A" and "B" are restored to the source storage device 112 at a subsequent time, e.g., during the restoration procedure described below in conjunction with FIGS. 4F-4G.

Accordingly, at the conclusion of step 440 of FIG. 4D, the file system manager 110 has identified a perfect clone relationship 412 between the source files 116 "A" and "B" and preserved the perfect clone relationship 412 among the corresponding destination files 132 "A" and "B" using hard-links. Additionally, as noted above, the file system manager 110 can also identify and preserve partial clone relationships between source files 116 when backing up the source files 116 from the source storage device 112 to the destination storage device 130.

Figure 4E:
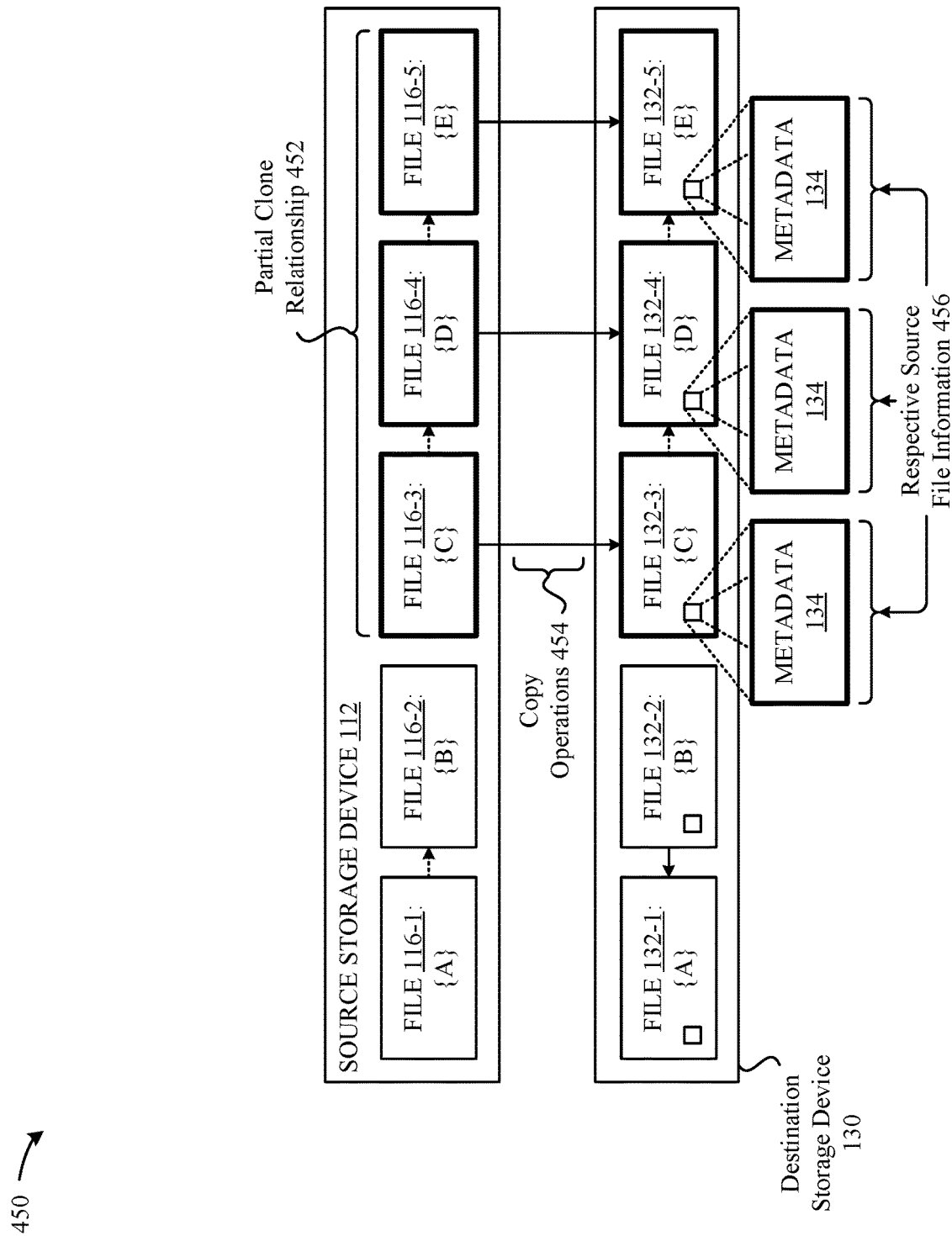

Accordingly, FIG. 4E illustrates a step 450 that covers partial clone discovery and retention when performing backups. As shown in FIG. 4E, the step 450 can involve the file system manager 110 identifying, in response to receiving a backup request, that a partial clone relationship 452 exists between the source files 116 "C", "D", and "E" (e.g., using the techniques described above in conjunction with FIGS. 2A-2E). In response, the file system manager 110 can carry out the backup with the goal of preserving the partial clone relationship 452 between the source files 116 "C", "D", and "E" within the source storage device 112. However, as noted above, in the example scenario illustrated in conjunction with FIGS. 4A-4H, the destination storage device 130 does not support file cloning. Moreover, the hard-link approach described herein also cannot be utilized, as the underlying content is different for each of the source files 116 "C", "D", and "E" (in accordance with the partial clone relationship 452). However, as described below in greater detail, information about the source files 116 "C", "D", and "E" can be noted within the destination storage device 130 so that the partial clone relationship 452 can be preserved and re-established when performing restoration operations at a subsequent time.

As shown in FIG. 4E, step 450 can involve copying (via copy operations 454) each of the source files 116 "C", "D", and "E" from the source storage device 112 to the destination storage device 130 to establish destination files 132 "C", "D", and "E". According to some embodiments, each of destination files 132 "C", "D", and "E" can represent complete copies of their counterpart source files 116. Alternatively, the file system manager 110 can attempt to minimize the overall storage space consumption within the destination storage device 130 by copying only the unique extents 124 that exist across the source files 116 "C", "D", and "E". For example, when performing the clone discovery techniques described herein, the file system manager 110 can identify that the source file 116 "C" serves as a base file for the source files "D" and "E", and copy all of the extents 124 of the source file 116 "C" from the source storage device 112 to the destination storage device 130. Next, the file system manager 110 can identify that the source file 116 "D" differs from the source file 116 "C" by only a single extent 124, and copy only that extent 124 (e.g., as a destination file 132) to the destination storage device 130. Continuing with this example, the file system manager 110 can identify that the source file 116 "E" differs from the source file 116 "D" by only a single extent 124, and copy only that extent 124 (e.g., as a destination file 132) to the destination storage device 130.

In any case, the file system manager 110 can store, within metadata 134 of the destination files 132, various information about the relationships between the source files 116/corresponding destination files 132 (as illustrated in FIG. 4E as respective source file information 456). For example, as shown in FIG. 4E, the file system manager 110 can be configured gather, for each of the source files 116 "C", "D", and "E" (i) block map information associated with the source file 116, and (ii) timestamp information associated with the source file 116. As previously described above, the block map information for a source file 116 can include various information about the source file 116 itself (e.g., an identifier 118), extents 124 of the source file 116 (e.g., a logical offset 126, a physical block offset 128, a number of physical blocks 129 etc.), and so on. Additionally, the timestamp information for a source file 116 can include any temporal information associated with the source file 116, e.g., a creation date, a last-accessed date, a last-modified date, and so on. This timestamp information can be utilized by the file system manager 110 to identify the order in which files are created, which can be useful when attempting to replicate partial clone relationships (e.g., during a restoration procedure) between one or more files. It noted that the foregoing listings are merely exemplary, and that any information associated with the source files 116 can be utilized to implement/supplement the techniques described herein. In this manner, the file system manager 110 can utilize this information to effectively re-establish the partial clone relationship 452 when the destination files 132 "C", "D", and "E" are restored to the source storage device 112 at a subsequent time, e.g., during the restoration procedure described below in conjunction with FIGS. 4F-4G.

Figure 4F:
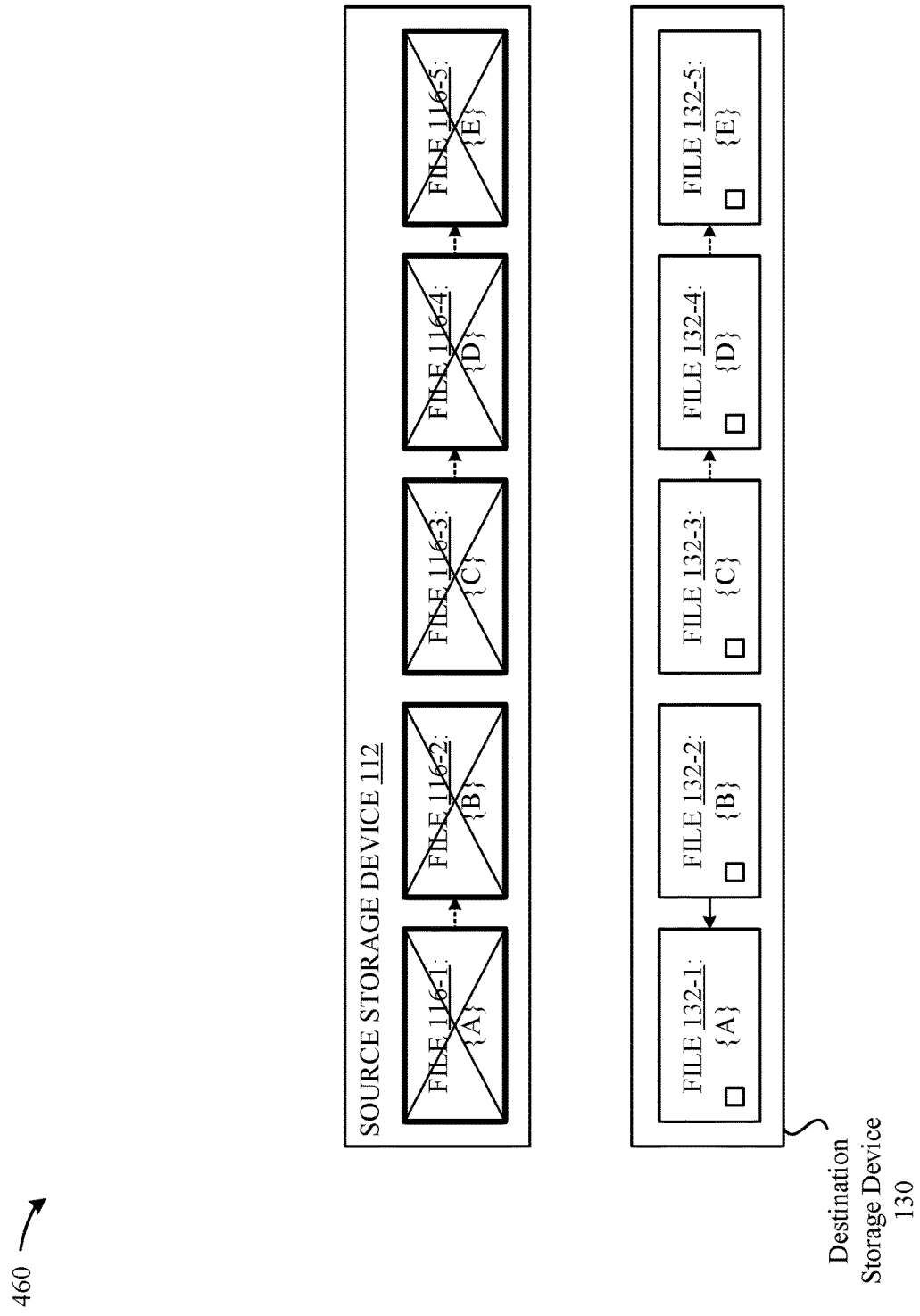

As shown in FIG. 4F, a step 460 can involve the file system manager 110 identifying a condition in which the source files 116 "A", "B", "C", "D", and "E" are no longer accessible within the source storage device 112. This can occur, for example, when the source storage device 112 becomes corrupted, when the computing device 102 (in which the source storage device 112 is included) is lost, and so on. In any case, the file system manager 110 can initialize a restoration procedure to restore the destination files 132 "A", "B", "C", "D", and "E" from the destination storage device 130 to the source storage device 112. As described below in greater detail, restoring the destination files 132 "A", "B", "C", "D", and "E" can involve the file system manager 110 reproducing both the perfect clone relationship 412 and the partial clone relationship 452 (between the appropriate restored files). In particular, the file system manager 110 can reproduce these clone relationships by utilizing the metadata 134 that was established when creating the destination files 132 "A", "B", "C", "D", and "E" within the destination storage device 130 (as described above in conjunction with FIGS. 4A-4E).

Figure 4G:
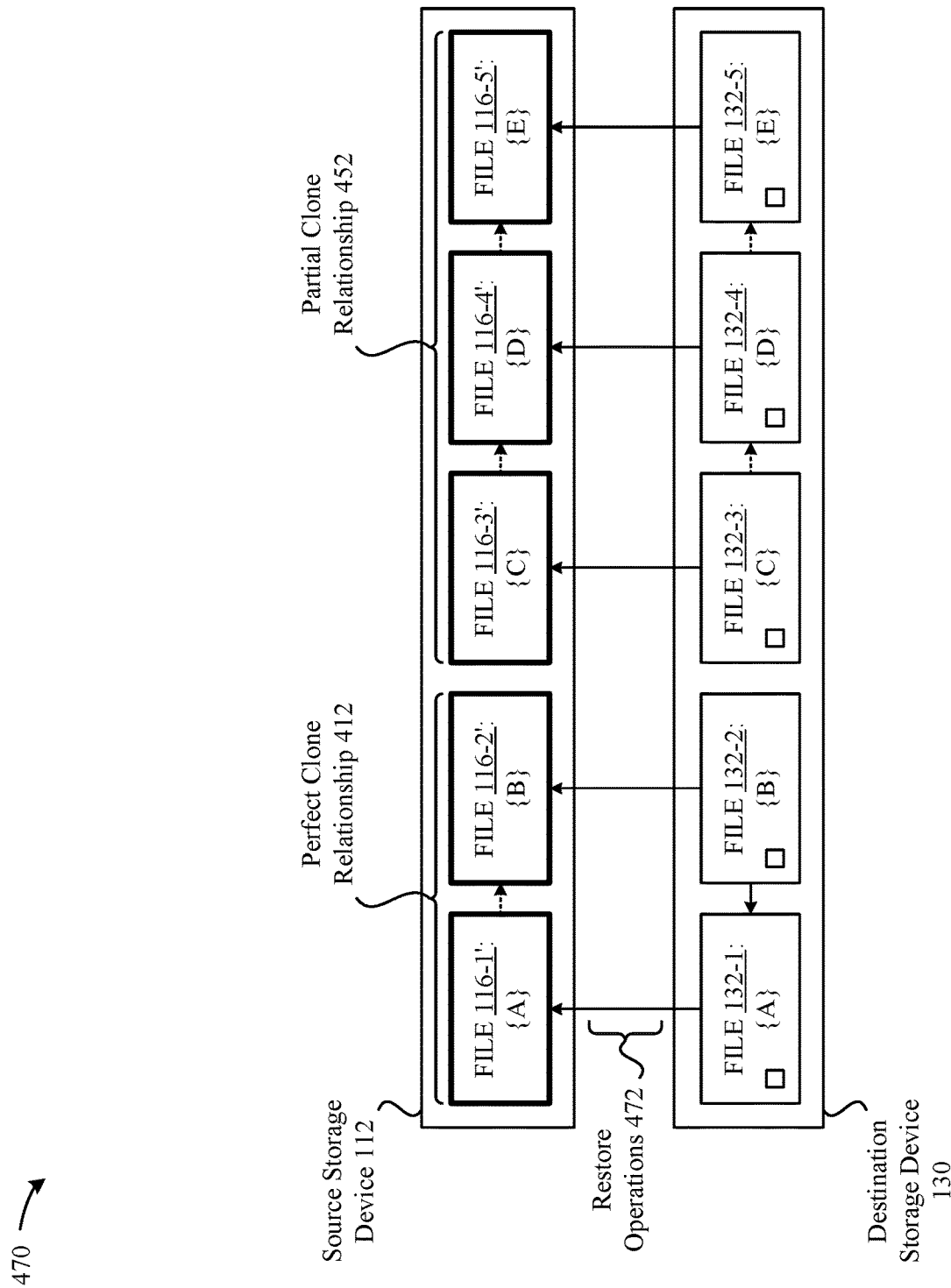

Accordingly, at step 470 of FIG. 4G, the file system manager 110 can first restore the destination files 132 "A" and "B" via restore operations 472. According to some embodiments, restoring the destination files 132 "A" and "B"—which, originally, were members of the perfect clone relationship 412—can involve the file system manager 110 creating, within the source storage device 112, a restored source file 116 "A" that corresponds to the destination file 132 "A". For example, the file system manager 110 can identify, based on the metadata 134 for one or more of the destination files 132 "A" and "B", that the destination files 132 "A" and "B"— despite being hard-linked within the destination storage device 130—are members of the perfect clone relationship 412. In turn, the file system manager 110 can copy the underlying data of the destination file 132 "A" to the source storage device 112 to establish the restored source file 116 "A". Next, in accordance with the metadata 134 associated with the destination files 132 "A" and "B", the file system manager 110 can clone the restored source file 116 "A" to produce a restored source file 116 "B", thereby re-instantiating the perfect clone relationship 412 between the restored source files 116 "A" and "B"—as well as the storage space savings that benefit from the perfect clone relationship 412.

Additionally, at step 470 of FIG. 4G, the file system manager 110 can restore the destination files 132 "C", "D", and "E" via the restore operations 472. According to some embodiments, restoring the destination files 132 "C", "D", and "E"—which, originally, were members of the partial clone relationship 452—can involve the file system manager 110 creating, within the source storage device 112, a restored source file 116 "C" that corresponds to the destination file 132 "C". For example, the file system manager 110 can identify, based on the metadata 134 (e.g., timestamps, block maps, etc.) associated with one or more of the destination files 132 "C", "D", and "E", that the destination file 132 "C" serves as a base file for the destination files 132 "D" and "E" (e.g., as described above), and copy all of the extents 124 of the destination file 132 "C" from the source storage device 112 to the destination storage device 130 to establish the restored source file 116 "C". According to some embodiments, the destination file 132 "C" can be identified as the base file when its creation date is earlier than the other destination files 132 "D" and "E". Next, the file system manager 110 can identify, based the metadata 134, that the destination file 132 "D" (i) is derived from the destination file 132 "C" (e.g., based on timestamp information), and (ii) differs from the source file 116 "C" by only a single extent 124 (e.g., as described above). In turn, the file system manager 110 can clone the restored source file 116 "C" within the source storage device 112 to establish a restored source file 116 "D", and propagate the appropriate changes (e.g., the different extent 124) into the restored source file 116 "D" within the source storage device 112. Additionally, the file system manager 110 can identify, based the metadata 134, that the destination file 132 "E" (i) is derived from the destination file 132 "D" (e.g., based on timestamp information), and (ii) differs from the source file 116 "D" by only a single extent 124 (e.g., as described above). In turn, the file system manager 110 can clone the restored source file 116 "D" within the source storage device 112 to establish a restored source file 116 "E", and propagate the appropriate changes (e.g., the different extent 124) into the restored source file 116 "E" within the source storage device 112.

Accordingly, at the conclusion of FIG. 4G, the restored source files 116 "A" "B" are stored within the source storage device 112 in accordance with the perfect clone relationship 412. Moreover, the restored source files 116 "C", "D", and "E" are stored within the source storage device 112 in accordance with the partial clone relationship 452. In this regard, the techniques described in conjunction with FIGS. 4A-4G enable the file system manager 110 to preserve clone relationships—at least in part (e.g., using hard-links, metadata, and so on)—within destination storage devices that do not support file cloning. Moreover, the techniques described in conjunction with FIGS. 4A-4G enable the file system manager 110 to restore the backed-up files to source storage devices that support file cloning, such that the original perfect/partial clone relationships—and the various benefits afforded by these clone relationships—remains intact.

Accordingly, FIGS. 4A-4G provide a detailed breakdown of an example scenario in which the file system manager 110 preserves clone relationships when backing up and restoring files between a source storage device (that supports file cloning) and a destination storage device that does not support file cloning. A high-level breakdown of these various techniques will now be discussed below in conjunction with FIG. 4H, with reference to FIGS. 4A-4G.

FIG. 4H illustrates a method 480 for preserving clone relationships when backing up and restoring files between a source storage device (that supports file cloning) (e.g., the source storage device 112) and a destination storage device that does not support file cloning (e.g., the destination storage device 130), according to some embodiments. As shown in FIG. 4H, the method 480 begins at step 482, where the file system manager 110 receives a request to back up at least two source files 116 from the source storage device 112 to the destination storage device 130 (e.g., as described above in conjunction with FIG. 4A). At step 484, the file system manager 110 determines (i) the at least two source files 116 are members of a clone relationship, (ii) the source storage device 112 supports file cloning, and (iii) the destination storage device 130 does not support file cloning (e.g., as described above in conjunction with FIG. 4A).

At step 486, the file system manager 110 establishes, within the destination storage device 130, destination files 132 that correspond to the at least two source files 116 (e.g., as described above in conjunction with FIGS. 4A-4D). At step 488, the file system manager 110 updates metadata 134 associated with each destination file 132 in accordance with the clone relationship (e.g., as described above in conjunction with FIGS. 4A-4D). At step 490, the file system manager 110 receives a request to restore the destination files 132 to the source storage device 112 (e.g., at a time subsequent to the initial back up performed at step 482) (e.g., as described above in conjunction with FIGS. 4E-4F). Finally, at step 492, the file system manager 110 restores the destination files 132 to the source storage device 130 with the clone relationship intact (e.g., as described above in conjunction with FIGS. 4E-4F).

Figure 5:
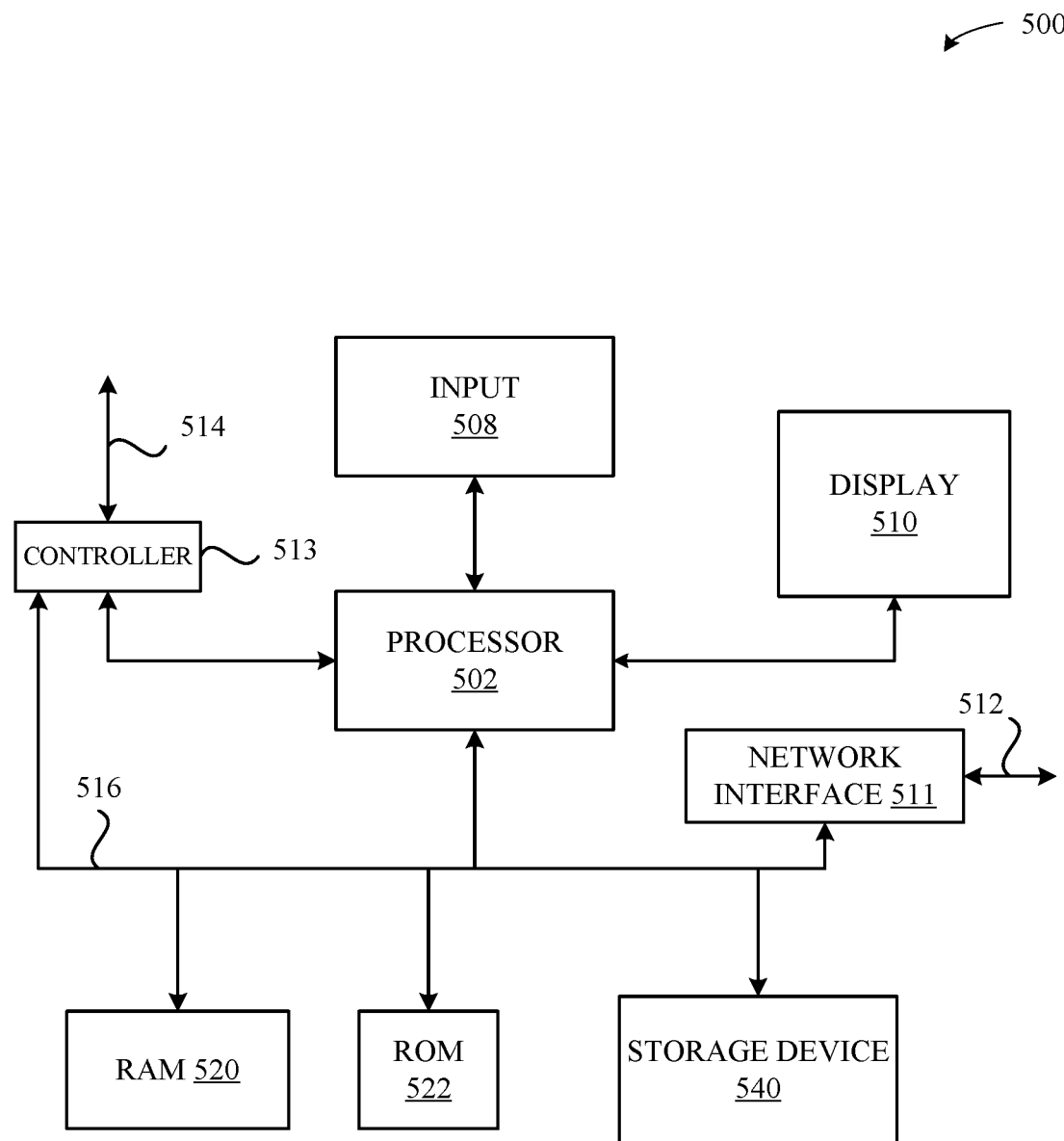
FIG. 5 illustrates a detailed view of components that can be included in the computing device illustrated in FIG. 1, according to some embodiments.

FIG. 5 illustrates a detailed view of a computing device 500 that can be used to implement the various techniques described herein, according to some embodiments. In particular, the detailed view illustrates various components that can be included in the computing device 102 described in conjunction with FIG. 1. As shown in FIG. 5, the computing device 500 can include a processor 502 that represents a microprocessor or controller for controlling the overall operation of the computing device 500. The computing device 500 can also include a user input device 508 that allows a user of the computing device 500 to interact with the computing device 500. For example, the user input device 508 can take a variety of forms, such as a button, keypad, dial, touch screen, audio input interface, visual/image capture input interface, input in the form of sensor data, and so on. Still further, the computing device 500 can include a display 510 that can be controlled by the processor 502 (e.g., via a graphics component) to display information to the user. A data bus 516 can facilitate data transfer between at least a storage device 540, the processor 502, and a controller 513. The controller 513 can be used to interface with and control different equipment through an equipment control bus 514. The computing device 500 can also include a network/bus interface 511 that couples to a data link 512. In the case of a wireless connection, the network/bus interface 511 can include a wireless transceiver.

As noted above, the computing device 500 also includes the storage device 540, which can comprise a single disk or a collection of disks (e.g., hard drives). In some embodiments, storage device 540 can include flash memory, semiconductor (solid state) memory or the like. The computing device 500 can also include a Random-Access Memory (RAM) 520 and a Read-Only Memory (ROM) 522. The ROM 522 can store programs, utilities or processes to be executed in a non-volatile manner. The RAM 520 can provide volatile data storage, and stores instructions related to the operation of applications executing on the computing device 500, e.g., the file system manager 110.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for utilizing a data structure to identify clone relationships between a plurality of files managed by a computing device, the method comprising, at the computing device:

receiving a request to perform an operation on the plurality of files;

for each file that is identified as a cloned file, and for each extent of a plurality of extents of which the file is comprised:
  entering, into a respective node of the data structure, information about the extent, wherein the information includes a physical block offset of the extent;
  sorting the nodes of the data structure based on the physical block offsets of the extents; and
  identifying, based on the information included in the nodes of the data structure, overlaps that exist between extents of the files, wherein the overlaps indicate clone relationships between the files.

2. The method of claim 1, wherein the data structure is a tree, a linked list, an array, or a hash table.

3. The method of claim 1, wherein each clone relationship comprises a perfect clone relationship or a partial clone relationship.

4. The method of claim 1, wherein at least two files of the plurality of files are members of a perfect clone relationship when the extents of the at least two files are identical in nature.

5. The method of claim 1, wherein at least two files of the plurality of files are members of a partial clone relationship when at least one physical block overlap exists between extents of the at least two files.

6. The method of claim 1, wherein the operation comprises a copy operation or a backup operation.

7. The method of claim 1, wherein the plurality of extents describes a layout of the file within a storage device with which the computing device is communicably coupled.

8. At least one non-transitory computer readable storage medium configured to store instructions that, when executed by at least one processor included in a computing device, cause the computing device to identify clone relationships between a plurality of files, by carrying out steps that include:
  receiving a request to perform an operation on the plurality of files;
  for each file that is identified as a cloned file, and for each extent of a plurality of extents of which the file is comprised:
    entering, into a respective node of the data structure, information about the extent, wherein the information includes a physical block offset of the extent;
    sorting the nodes of the data structure based on the physical block offsets of the extents; and
    identifying, based on the information included in the nodes of the data structure, overlaps that exist between extents of the files, wherein the overlaps indicate clone relationships between the files.

9. The at least one non-transitory computer readable storage medium of claim 8, wherein the data structure is a tree, a linked list, an array, or a hash table.

10. The at least one non-transitory computer readable storage medium of claim 8, wherein each clone relationship comprises a perfect clone relationship or a partial clone relationship.

11. The at least one non-transitory computer readable storage medium of claim 8, wherein at least two files of the plurality of files are members of a perfect clone relationship when the extents of the at least two files are identical in nature.

12. The at least one non-transitory computer readable storage medium of claim 8, wherein at least two files of the plurality of files are members of a partial clone relationship when at least one physical block overlap exists between extents of the at least two files.

13. The at least one non-transitory computer readable storage medium of claim 8, wherein the operation comprises a copy operation or a backup operation.

14. The at least one non-transitory computer readable storage medium of claim 8, wherein the plurality of extents describes a layout of the file within a storage device with which the computing device is communicably coupled.

15. A computing device configured to identify clone relationships between a plurality of files, the computing device comprising:
  at least one processor; and
  at least one memory storing instructions that, when executed by the at least one processor, cause the computing device to perform steps that include:
    receiving a request to perform an operation on the plurality of files;
    for each file that is identified as a cloned file, and for each extent of a plurality of extents of which the file is comprised:
      entering, into a respective node of the data structure, information about the extent, wherein the information includes a physical block offset of the extent;
      sorting the nodes of the data structure based on the physical block offsets of the extents; and
      identifying, based on the information included in the nodes of the data structure, overlaps that exist between extents of the files, wherein the overlaps indicate clone relationships between the files.

16. The computing device of claim 15, wherein the data structure is a tree, a linked list, an array, or a hash table.

17. The computing device of claim 15, wherein each clone relationship comprises a perfect clone relationship or a partial clone relationship.

18. The computing device of claim 15, wherein at least two files of the plurality of files are members of a perfect clone relationship when the extents of the at least two files are identical in nature.

19. The computing device of claim 15, wherein at least two files of the plurality of files are members of a partial clone relationship when at least one physical block overlap exists between extents of the at least two files.

20. The computing device of claim 15, wherein the operation comprises a copy operation or a backup operation.

* * * * *